US012365373B2

(12) United States Patent
Amouie et al.

(10) Patent No.: US 12,365,373 B2
(45) Date of Patent: Jul. 22, 2025

(54) UNDERCARRIAGE INSPECTION ASSEMBLIES AND SYSTEMS

(71) Applicants: Norfolk Southern Corporation, Atlanta, GA (US); GEORGIA TECH RESEARCH CORPORATION, Atlanta, GA (US)

(72) Inventors: Mabby Nicholas Amouie, Atlanta, GA (US); Evan Thomas Gebhardt, Atlanta, GA (US); Colin Usher, Atlanta, GA (US); Alex Samoylov, Atlanta, GA (US); John Hoang, Atlanta, GA (US); Sean Thomas, Atlanta, GA (US); Parth Mandrekar, Atlanta, GA (US); Brian Thomas Yeager, Atlanta, GA (US); Thomas Samuel Fox, Atlanta, GA (US)

(73) Assignee: Norfolk Southern Corporation & Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/829,199

(22) Filed: Sep. 9, 2024

(65) Prior Publication Data
US 2025/0088759 A1 Mar. 13, 2025

Related U.S. Application Data

(60) Provisional application No. 63/582,165, filed on Sep. 12, 2023, provisional application No. 63/581,554, filed on Sep. 8, 2023.

(51) Int. Cl.
*H04N 23/90* (2023.01)
*B61L 25/02* (2006.01)
(Continued)

(52) U.S. Cl.
CPC ............ *H04N 23/90* (2023.01); *B61L 25/021* (2013.01); *B61L 25/025* (2013.01); *B61L 27/53* (2022.01);
(Continued)

(58) Field of Classification Search
CPC ........ B61L 27/57; B61L 1/20; B61L 2205/04; B61L 23/00; B61L 23/045; B61L 25/021;
(Continued)

(56) References Cited

U.S. PATENT DOCUMENTS 4,915,504 A 4/1990 Thurston
5,793,492 A 8/1998 Vanaki
(Continued)

FOREIGN PATENT DOCUMENTS

CN 111483496 A 8/2020
CN 111923962 A 11/2020
(Continued)

OTHER PUBLICATIONS

Non-Final Office Action For U.S. Appl. No. 18/829,189 dated Nov. 4, 2024, 18 pages.
(Continued)

*Primary Examiner* — Masum Billah
(74) *Attorney, Agent, or Firm* — Bradley Arant Boult Cummings LLP; Daniel E. Sineway, Esq.

(57) ABSTRACT

Assemblies, systems, and methods for inspecting vehicles are disclosed. An assembly can comprise a first angled camera, a second angled camera, an upright camera, lights, and a housing configured to attach to a railway between opposing rails. The first angled camera can be oriented at least partially in a vertical direction and at least partially in a first horizontal direction, and directed to a first target region from a first viewpoint. The second angled camera can be oriented at least partially in the vertical direction and at
(Continued)

least partially in a second horizontal direction that is substantially opposite the first horizontal direction, and directed to a second target region from a second viewpoint. The upright camera can be oriented substantially in a vertical direction, and configured to capture images of a third target region from a third viewpoint.

17 Claims, 25 Drawing Sheets

(51) Int. Cl.
| | |
|---|---|
| B61L 27/53 | (2022.01) |
| B61L 27/57 | (2022.01) |
| B61L 27/70 | (2022.01) |
| G01M 17/10 | (2006.01) |
| G06T 7/00 | (2017.01) |
| G06T 7/55 | (2017.01) |
| G06T 7/80 | (2017.01) |
| G06V 20/52 | (2022.01) |
| G06V 20/54 | (2022.01) |
| G06V 20/62 | (2022.01) |
| G06V 30/10 | (2022.01) |
| H04N 7/18 | (2006.01) |
| H04N 23/11 | (2023.01) |
| H04N 23/51 | (2023.01) |
| H04N 23/52 | (2023.01) |
| H04N 23/56 | (2023.01) |
| H04N 23/60 | (2023.01) |

(52) U.S. Cl.
CPC .............. *B61L 27/57* (2022.01); *B61L 27/70* (2022.01); *G01M 17/10* (2013.01); *G06T 7/0002* (2013.01); *G06T 7/001* (2013.01); *G06T 7/55* (2017.01); *G06T 7/80* (2017.01); *G06V 20/52* (2022.01); *G06V 20/54* (2022.01); *G06V 20/63* (2022.01); *G06V 30/10* (2022.01); *H04N 7/18* (2013.01); *H04N 7/188* (2013.01); *H04N 23/11* (2023.01); *H04N 23/51* (2023.01); *H04N 23/52* (2023.01); *H04N 23/56* (2023.01); *H04N 23/64* (2023.01); *G06T 2207/10024* (2013.01); *G06T 2207/10048* (2013.01); *G06T 2207/30252* (2013.01); *G06V 2201/08* (2022.01)

(58) Field of Classification Search
CPC ...... B61L 25/025; B61L 1/00; B61L 15/0027; B61L 15/0081
USPC .......................................................... 348/131
See application file for complete search history.

(56) References Cited

U.S. PATENT DOCUMENTS

| | | |
|---|---|---|
| 6,813,581 B1 | 11/2004 | Snyder |
| 6,909,514 B2 | 6/2005 | Nayebi |
| 7,681,443 B2 | 3/2010 | Kilian et al. |
| 7,714,886 B2 | 5/2010 | Kilian et al. |
| 7,715,026 B2 | 5/2010 | Nayebi |
| 8,289,526 B2 | 10/2012 | Kilian et al. |
| 8,480,008 B1 | 7/2013 | Arnold |
| 8,668,136 B2 | 3/2014 | Ahern et al. |
| 8,780,189 B2 | 7/2014 | Kilian et al. |
| 8,934,007 B2 | 1/2015 | Snead |
| 9,033,219 B2 | 5/2015 | Schoner et al. |
| 9,073,559 B2 | 7/2015 | Kilian et al. |
| 9,129,248 B2 | 9/2015 | Reynolds et al. |
| 9,438,754 B2 | 9/2016 | Schoner et al. |
| 9,516,199 B2 | 12/2016 | Kilian et al. |
| 9,625,607 B2 | 4/2017 | Tudor et al. |
| 9,671,191 B1 | 6/2017 | Sullivan et al. |
| 9,709,394 B2 | 7/2017 | Schoner et al. |
| 9,836,893 B2 | 12/2017 | Chundru et al. |
| 10,513,279 B2 | 12/2019 | Mulligan |
| 10,523,858 B1 | 12/2019 | Arcaini et al. |
| 10,984,521 B2 | 4/2021 | Kohler et al. |
| 11,107,233 B2 | 8/2021 | Saniei et al. |
| 11,172,107 B1 | 11/2021 | Hoeppner |
| 11,235,788 B2 | 2/2022 | Snyder et al. |
| 11,285,980 B2 | 3/2022 | Popplewell |
| 11,423,559 B2 | 8/2022 | Kohler |
| 11,620,743 B2 | 4/2023 | Kohler et al. |
| 11,688,169 B1 | 6/2023 | Dryer et al. |
| 11,763,480 B2 | 9/2023 | Saniei et al. |
| 11,776,145 B2 | 10/2023 | Kohler |
| 11,861,509 B2 | 1/2024 | Neal, Jr. et al. |
| 11,891,098 B1 | 2/2024 | Smythe et al. |
| 11,932,290 B2 | 3/2024 | Davis et al. |
| 11,974,035 B1 | 4/2024 | Buschelman |
| 12,033,312 B2 | 7/2024 | Kohler et al. |
| 2004/0263624 A1 | 12/2004 | Nejikovsky et al. |
| 2005/0253926 A1 | 11/2005 | Chung et al. |
| 2006/0276985 A1* | 12/2006 | Xu .................. G01C 11/025 702/81 |
| 2007/0040911 A1* | 2/2007 | Riley .................. H04N 7/181 348/E7.086 |
| 2010/0100275 A1 | 4/2010 | Mian et al. |
| 2012/0113259 A1 | 5/2012 | Jie et al. |
| 2013/0054158 A1 | 2/2013 | Toms |
| 2016/0096536 A1 | 4/2016 | Toms |
| 2017/0199215 A1 | 7/2017 | Arcaini et al. |
| 2018/0222498 A1 | 8/2018 | Kelley |
| 2018/0237041 A1 | 8/2018 | Mesher |
| 2019/0061791 A1 | 2/2019 | Yaktine et al. |
| 2019/0094154 A1 | 3/2019 | Iler |
| 2019/0260972 A1 | 8/2019 | Behety |
| 2020/0408682 A1 | 12/2020 | Mian et al. |
| 2021/0058588 A1 | 2/2021 | Abreo |
| 2021/0403060 A1 | 12/2021 | Pertosa |
| 2022/0377251 A1* | 11/2022 | Grata .................. H04N 23/51 |
| 2023/0194746 A1 | 6/2023 | Morton |
| 2023/0410342 A1 | 12/2023 | Kohler |
| 2023/0410354 A1 | 12/2023 | Saniei et al. |
| 2024/0004775 A1 | 1/2024 | Liu |
| 2024/0035931 A1 | 2/2024 | Grata |
| 2024/0043043 A1 | 2/2024 | Brooks et al. |
| 2024/0137635 A1 | 4/2024 | Buschelman |
| 2024/0236464 A9 | 7/2024 | Buschelman |

FOREIGN PATENT DOCUMENTS

| | | |
|---|---|---|
| CN | 111942434 A | 11/2020 |
| WO | 9532581 A1 | 11/1995 |
| WO | 2022192962 A1 | 9/2022 |
| WO | 2024050200 A1 | 3/2023 |
| WO | 2024050201 A1 | 3/2024 |
| WO | 2024196402 A1 | 9/2024 |

OTHER PUBLICATIONS

Non-Final Office Action For U.S. Appl. No. 18/829,200 dated Oct. 29, 2024, 19 pages.

Non-Final Office Action For U.S Appl. No. 18/829,194 dated Nov. 18, 2024, 18 pages.

Chong et al., S.Y. A Review of Health and Operation Monitoring Technologies for Trains, Google Scholar, Smart Structures and Systems, vol. 6, No. 9, 2010, pp. 1079-1105. (Year: 2010).

Gao et al., L. Anomaly Detection of Trackside Equipment Based on GPS and Image Matching, IEEE Access, vol. 6, Jan. 2020, pp. 17346-17355.

Notice of Allowance for U.S. Appl. No. 18/829,216 dated Dec. 12, 2024, 2 pages.

Qiushi et al., "M. Composite Railway Health Monitoring System based on Fiber Optic Bragg Grating Sensing Array", IEEE Far East

(56) References Cited

OTHER PUBLICATIONS

Forum on Nondestructive Evaluation/Testing, Jun. 2014, pp. 259-264.

* cited by examiner

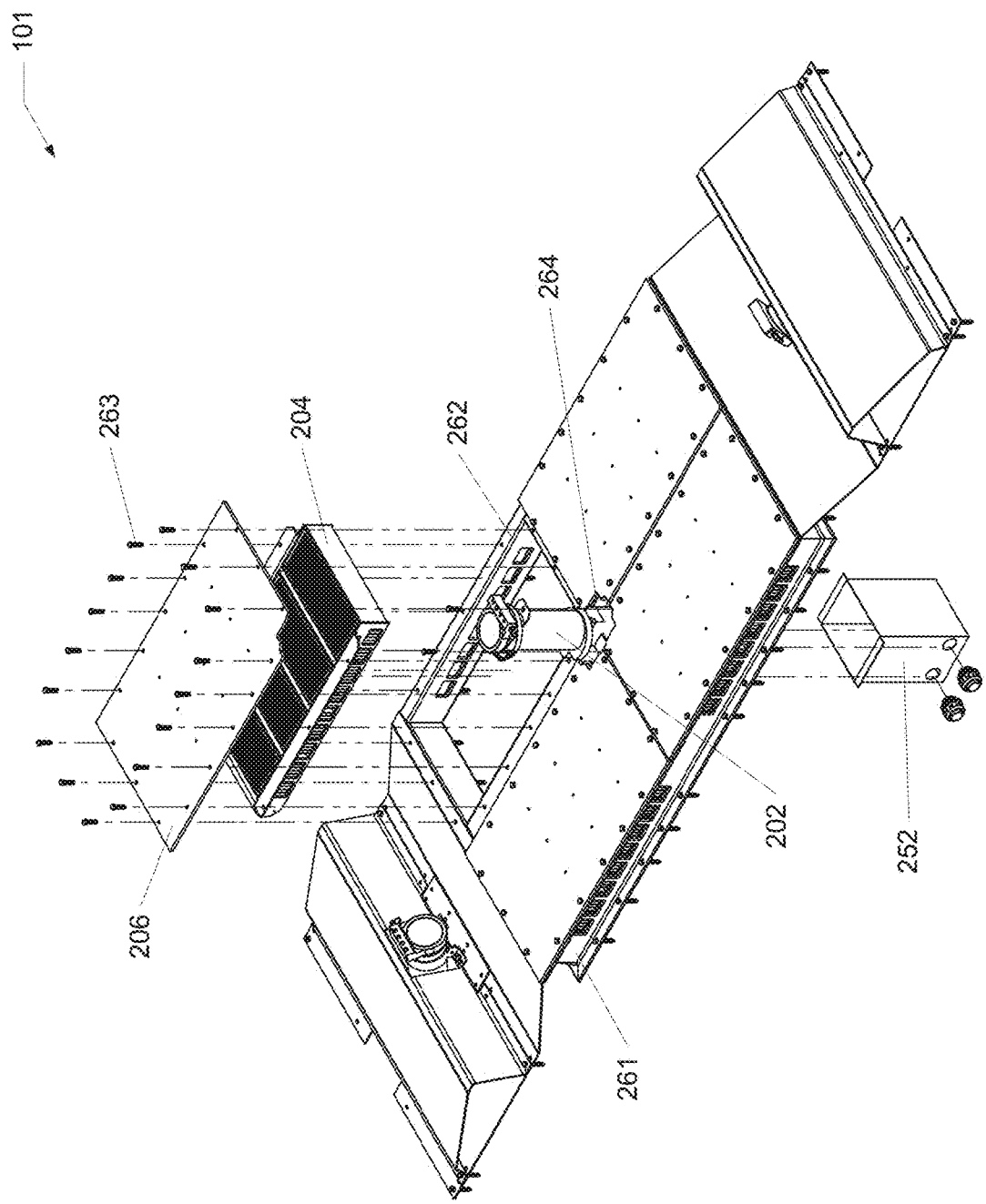

UNDERCARRIAGE INSPECTION ASSEMBLIES AND SYSTEMS

CROSS-REFERENCE TO RELATED APPLICATIONS

This application claims the benefit of, and priority to, U.S. Provisional Patent App. No. 63/581,554, filed on Sep. 8, 2023, and entitled "APPARATUSES, SYSTEMS, AND METHODS FOR MONITORING TRAIN RAILCARS," and U.S. Provisional Patent App. No. 63/582,165, filed on Sep. 12, 2023, and entitled "APPARATUSES, SYSTEMS, AND METHODS FOR MONITORING TRAIN RAILCARS," the disclosures of which are incorporated by reference in their entireties as if the same were fully set forth herein.

TECHNICAL FIELD

This application generally relates to systems and methods for inspecting passing vehicles and, more specifically, to various components and systems for gathering data on, monitoring, and inspecting the undercarriage of passing trains in railway settings.

BACKGROUND

Trains are vital transportation mediums used to distribute a large quantity of goods around the world. Due to their robust nature and efficiency, trains and their sub-components, such as railcars and locomotives, are commonly used repeatedly throughout their lifetime. Repeated and constant use of a particular train can cause the particular train to experience degradation over time. The trains are traditionally inspected by individuals at rail yards for any particular issue and to prevent safety and functionality hazards. These inspections can be costly due to the manpower necessary to properly complete the inspections, the amount of time it takes to inspect the trains, and the lost revenue associated with keeping the train in the railyard. Additionally, humans can occasionally miss issues that can lead to safety hazards and/or functional issues with the train.

Therefore, there is a long-felt but unresolved need for a system or method that monitors trains during use, minimizes or otherwise reduces the man-hours necessary for inspecting railcars, identifies a wide variety of issues associated with the railcars, records data associated with the railcars, and/or generates insights associated with the railcars inspected by the disclosed system.

BRIEF SUMMARY OF THE DISCLOSURE

Briefly described, and according to one example, aspects of the present disclosure generally relate to systems and methods for capturing line-scan images and area-scan images of the undercarriage of a passing railcar. The disclosed technology can include an inspection portal system. The inspection portal system can include two or more systems used to capture data on the undercarriage of the passing railcar. The inspection portal system can include an undercarriage area-scan inspection system and an undercarriage line-scan inspection system. The undercarriage area-scan inspection system can capture area-scan images of the undercarriage of the passing railcar. The undercarriage line-scan inspection system can capture line-scan images of the undercarriage of the passing railcar. The undercarriage area-scan inspection system and the undercarriage line-scan inspection systems can attach to one or more rail ties of a train track such that the undercarriage area-scan inspection system and the undercarriage line-scan inspection systems can capture images of the undercarriage of the passing railcar.

The undercarriage area-scan inspection system can include one or more cameras, lights, and/or sensors used to capture area-scan images of the undercarriage of the passing railcar. For example, the undercarriage area-scan inspection system can include a first angled camera, a vertical camera, and a second angled camera. The first angled camera, the vertical camera, and the second angled camera can include any particular high-speed, high-resolution, and/or high-sensitivity camera sensor able to capture high resolution area-scan images of the passing railcar. The first angled camera, the vertical camera, and the second angled camera can capture area-scan images of the undercarriage of the passing railcar. For example, the first angled camera, the vertical camera, and the second angled camera be configured to capture area-scan images of a three-dimensional region of the undercarriage of the passing railcar. The first angled camera, the vertical camera, and the second angled camera can capture area-scan images of specific regions of the undercarriage and/or specific components of the undercarriage. For example, the undercarriage area-scan inspection system can capture area-scan images of the undercarriage of the passing railcar with a blur of less than 2 mm and of passing railcars moving at speeds up to 70 miles per hour (or faster).

The undercarriage line-scan inspection system can include one or more cameras, lights, and/or sensors used to capture line-scan images of the undercarriage of the passing railcar. The undercarriage line-scan inspection system can include a line-scan camera. The line-scan camera can include any particular high-speed, high-resolution, and/or high-sensitivity camera sensor able to capture high resolution line-scan images of the passing railcar. The line-scan camera can capture line-scan images of the undercarriage of the passing railcar. For example, the line-scan camera can be configured to capture line-scan images of a three-dimensional region of the undercarriage of the passing railcar. The line-scan camera can capture line-scan images of specific regions of the undercarriage and/or specific components of the undercarriage. For example, the undercarriage line-scan inspection system can capture line-scan images of the undercarriage of the passing railcar with a blur of less than 2 mm and of passing railcars moving at speeds up to 70 miles per hour (or faster).

According to a first aspect, an inspection assembly comprising: A) a first angled camera oriented at least partially in a vertical direction and at least partially in a first horizontal direction, the first angled camera being directed to a first target region in a three-dimensional space from a first viewpoint; B) a second angled camera oriented at least partially in the vertical direction and at least partially in a second horizontal direction that is substantially opposite the first horizontal direction, the second angled camera being directed to a second target region in a three-dimensional space from a second viewpoint; C) an upright camera oriented substantially in a vertical direction, the upright camera being configured to capture images of a third target region in the three-dimensional space from a third viewpoint; D) one or more lights; and E) a housing configured to attach to a railway at a location between opposing rails of the railway.

According to a further aspect, the inspection assembly of the first aspect or any other aspect, wherein the first angled camera is positioned a first distance from the upright camera and the second angled camera is positioned a second distance from the upright camera, at least one of the first distance or the second distance being at least 30 inches.

According to a further aspect, the inspection assembly of the first aspect or any other aspect, wherein the housing comprises: A) a first shroud covering at least a rear portion of the first angled camera, the first shroud having an upper height proximate a lens of the first angled camera and sloping downwardly in a first direction extending away from a center of the inspection assembly; and B) a second shroud covering at least a rear portion of the second angled camera, the second shroud having an upper height proximate a lens of the second angled camera and sloping downwardly in a second direction extending away from the center of the inspection assembly.

According to a further aspect, the inspection assembly of the first aspect or any other aspect, wherein the inspection assembly has a length that can extend across at least six rail ties of the railway.

According to a further aspect, the inspection assembly of the first aspect or any other aspect, wherein the one or more lights comprises a plurality of light arrays, the light arrays being substantially co-planarly arranged around the upright camera to form a light platform configured to distribute light in the vertical direction.

According to a further aspect, the inspection assembly of the first aspect or any other aspect, wherein at least two of the first target region, the second target region, or the third target region are the same target region.

According to a further aspect, the inspection assembly of the first aspect or any other aspect, wherein the first angled camera, the second angled camera, and the upright camera are configured to capture images of the same target region substantially simultaneously.

According to a further aspect, the inspection assembly of the first aspect or any other aspect, wherein the first angled camera, the second angled camera, and the upright camera are configured to capture images of the same target region within one microsecond of one another.

According to a further aspect, the inspection assembly of the first aspect or any other aspect, wherein the inspection assembly is configured to attach to the railway such that an uppermost portion of the inspection assembly is lower than a lowermost top surface of the opposing rails when the inspection assembly is attached to the railway.

According to a further aspect, the inspection assembly of the first aspect or any other aspect, further comprising one or more air curtains configured to blow air across a lens of at least one of the first angled camera, the second angled camera, or the upright camera.

According to a further aspect, the inspection assembly of the first aspect or any other aspect, wherein at least one of the first angled camera, the second angled camera, or the upright camera is an area scan camera.

According to a second aspect, an inspection assembly comprising: A) one or more line scan cameras configured to capture images in a generally vertical direction; B) a first light source configured to emit light in a first direction that extends at least partially in the vertical direction and at least partially in a first horizontal direction extending from the first light source toward the one or more line scan cameras; C) a second light source configured to emit light in a second direction that extends at least partially in the vertical direction and at least partially in a second horizontal direction extending from the second light source toward the one or more line scan cameras, the second horizontal direction being substantially opposite the first horizontal direction; D) a housing comprising: 1) a base configured to at least partially support the one or more line scan cameras, the first light source, and the second light source; 2) a first shroud located proximate the first light source and sloped downwardly in the second horizontal direction; and 3) a second shroud located proximate the second light source and sloped downwardly in the first horizontal direction, wherein the second shroud is spaced apart from the first shroud to thereby form a gap within which the first light source, the second light source, and the one or more line scan cameras are positioned, wherein the housing is configured to attach to a railway at a location between opposing rails of the railway.

According to a further aspect, the inspection assembly of the second aspect or any other aspect, wherein the first horizontal direction and the second horizontal direction are approximately parallel to opposing rails of the railway.

According to a further aspect, the inspection assembly of the second aspect or any other aspect, wherein the first horizontal direction and the second horizontal direction are approximately perpendicular to opposing rails of the railway.

According to a further aspect, the inspection assembly of the second aspect or any other aspect, wherein the inspection assembly has a length that can extend across at least four rail ties of the railway.

According to a further aspect, the inspection assembly of the second aspect or any other aspect, wherein the inspection assembly is configured to attach to the railway such that an uppermost portion of the inspection assembly is lower than a lowermost top surface of the opposing rails when the inspection assembly is attached to the railway.

According to a further aspect, the inspection assembly of the second aspect or any other aspect, further comprising one or more air curtains configured to blow air across a lens of a corresponding one of the one or more line scan cameras.

According to a further aspect, the inspection assembly of the second aspect or any other aspect, further comprising one or more dampening devices, each of the one or more dampening devices being disposed between the housing and a corresponding one of the one or more line scan cameras.

According to a third aspect, an inspection system comprising: A) a first imaging assembly comprising: 1) a first angled camera oriented at least partially in a vertical direction and at least partially in a first horizontal direction, the first angled camera being directed to a first target region in a three-dimensional space from a first viewpoint; 2) a second angled camera oriented at least partially in the vertical direction and at least partially in a second horizontal direction that is substantially opposite the first horizontal direction, the second angled camera being directed to a second target region in a three-dimensional space from a second viewpoint; 3) an upright camera oriented substantially in a vertical direction, the upright camera being configured to capture images of a third target region in the three-dimensional space from a third viewpoint; 4) one or more lights; and 5) a first housing configured to attach to a railway at a location between opposing rails of the railway; B) a second inspection assembly comprising: 1) one or more line scan cameras configured to capture images in the vertical direction; 2) a first light source configured to emit light in a first direction that extends at least partially in the vertical direction and at least partially in the first horizontal direction; 3) a second light source configured to emit light in a second direction that extends at least partially in the vertical direction and at least partially in the second horizontal direction;

4) a second housing comprising: i) a second base configured to at least partially support the one or more line scan cameras, the first light source, and the second light source; ii) a first shroud located proximate the first light source and sloped downwardly in the second horizontal direction; and iii) a second shroud located proximate the second light source and sloped downwardly in the first horizontal direction, wherein the second shroud is spaced apart from the first shroud to thereby form a gap within which the first light source, the second light source, and the one or more line scan cameras are positioned, wherein the housing is configured to attach to the railway at a location between opposing rails of the railway; and C) one or more computing devices in electrical communication with the first inspection assembly and the second inspection assembly, the one or more computing devices being configured to control operations of the first angled camera, the second angled camera, the upright camera, the one or more lights, the one or more line scan cameras, the first light source, and the second light source.

According to a further aspect, the inspection assembly of the third aspect or any other aspect, wherein: A) the first inspection assembly is positioned at a first location along the railway; B) the second inspection assembly is positioned at a second location along the railway, the second location being different from the first location; and C) the one or more computing devices is further configured to determine capture timings for each of the first angled camera, the second angled camera, the upright camera, and the one or more line scan cameras based at least in part on an estimated speed of a passing railcar such that the first angled camera, the second angled camera, and the upright camera are configured to simultaneously capture images of the passing railcar as the passing railcar passes over the first inspection assembly and the one or more line scan cameras are configured to capture images of the passing railcar as the passing railcar passes over the second inspection assembly.

These and other aspects, features, and benefits of the claimed innovation(s) will become apparent from the following detailed written description of the preferred examples and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more examples and/or aspects of the disclosure and, together with the written description, serve to explain the principles of the disclosure. Wherever possible, the same reference numbers are used throughout the drawings to refer to the same or like elements of the disclosed systems and processes, and wherein:

FIG. 2I, illustrates an exploded view of an undercarriage area-scan inspection system, in accordance with the disclosed technology;

DETAILED DESCRIPTION

Figure 1:
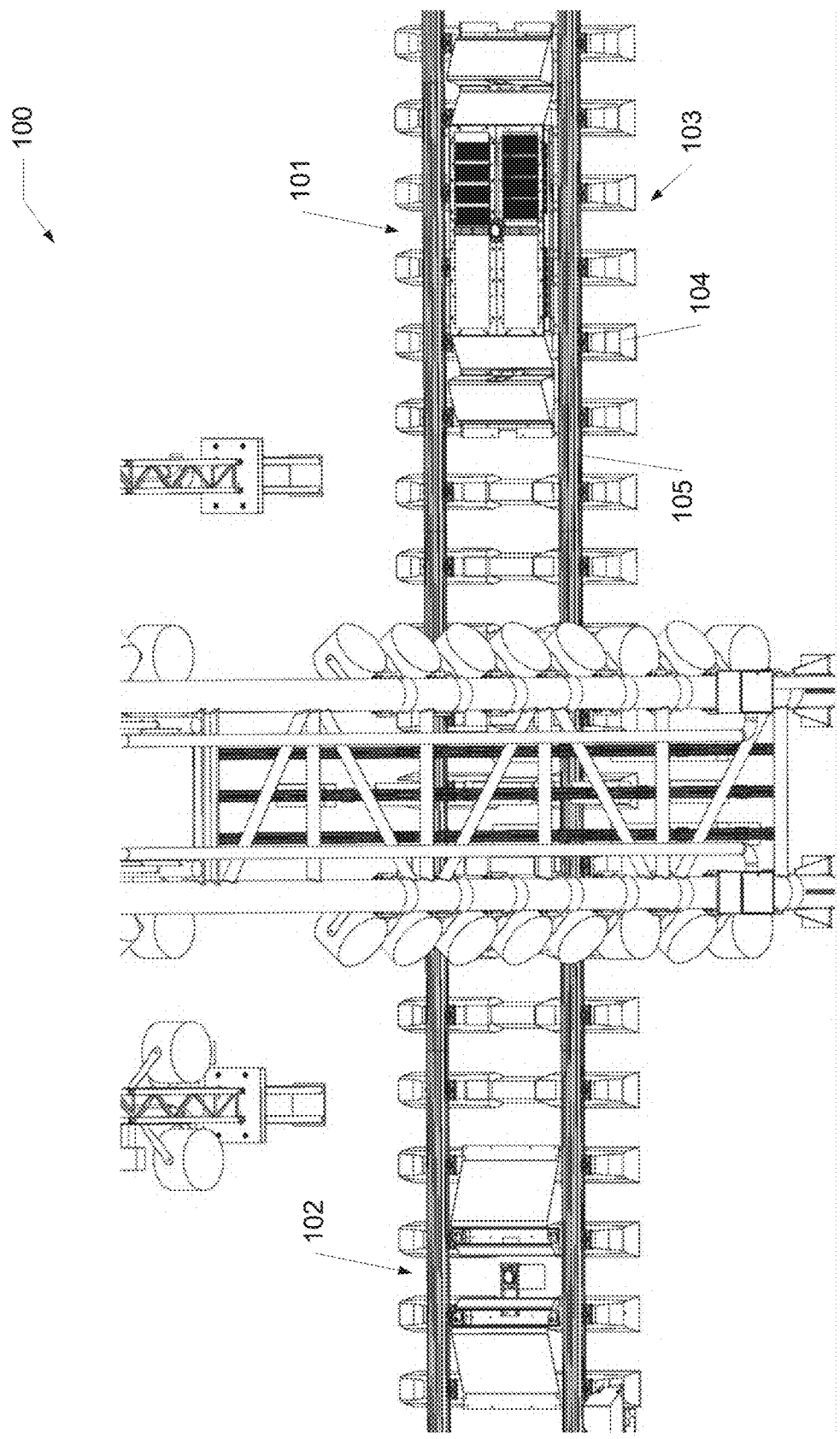
FIG. 1 illustrates an example perspective view of an inspection portal system, in accordance with the disclosed technology.

The disclosed technology relates generally to systems and methods for inspecting passing vehicles and, more specifically, to various components and systems for gathering data on, monitoring, and inspecting individual sections of moving rail-bound vehicles. The disclosed technology can function to monitor various forms of moving vehicles. The disclosed technology, though discussed in the setting of a railway, can be applied to any particular environment to monitor moving vehicles. For example, the disclosed technology can be applied to a highway, a truck weighing station, an airplane hangar, a boat canal, and/or any other particular setting where moving vehicles pass. Some examples of the disclosed technology will be described more fully with reference to the accompanying drawings. However, this disclosed technology may be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range of formats (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" or "from approximately 1 to approximately 6" includes the values 1, 6, and all values therebetween. Likewise, a range described as being "between 1 and 6" or "between approximately 1 and approximately 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to and are not intended to imply that the objects so described should be in a given sequence, either temporally, spatially, in ranking, or in any other manner.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the illustrative examples provided in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Example Embodiments

Referring now to the figures, for the purposes of example and explanation of the fundamental processes and components of the disclosed apparatuses, systems, and methods, reference is made to FIG. 1, which illustrates an inspection portal system 100, according to one or more examples. As will be understood and appreciated, the inspection portal system 100 shown in FIG. 1 represents merely one approach or example of the present system, and other aspects are used according to various examples of the present system.

The inspection portal system 100 can include one or more systems used to capture data on a passing railcar. For example, the inspection portal system 100 can include one or more individual systems that can collect images of the various components of the passing railcar. The various components of the passing railcar can include but are not limited to both lateral sides of the passing railcar, the undercarriage of the passing railcar, the roof of the passing railcar, the brakes of the passing railcar, the cross-key components of the passing railcar, and/or any other component or area of the passing railcar. The inspection portal system 100 can include one or more cameras, sensors, and/or lights used to capture data on the passing railcar.

The inspection portal system 100 can include two or more systems used to capture data on the undercarriage of the passing railcar. The inspection portal system 100 can include an undercarriage area-scan inspection system 101 and an undercarriage line-scan inspection system 102. The undercarriage area-scan inspection system 101 and the undercarriage line-scan inspection system 102 can each be located within two rails 105 of a train track 103. The undercarriage area-scan inspection system 101 and the undercarriage line-scan inspection system 102 can each be fixed to one or more rail ties 104. For example, the undercarriage area-scan inspection system 101 and the undercarriage line-scan inspection system 102 can each be secured to an existing train track 103. Continuing this example, the undercarriage area-scan inspection system 101 and the undercarriage line-scan inspection system 102 can each have adjustable securing mechanisms (e.g., lag bolts, screws, ties, bolts, etc.) that can fix to the rail ties 104 of distinct train tracks 103, where the train tracks 103 can include unique configurations, unique geometry, distinct spacing between rail ties 104 (e.g., in a range between approximately 12 inches and approximately 16 inches), and/or distinct curves in the train track 103.

The undercarriage area-scan inspection system 101 can include one or more cameras, lights, and/or sensors used to capture area-scan images of the undercarriage of the passing railcar. The undercarriage area-scan inspection system 101 can include a first angled camera 201, a vertical camera 202, and a second angled camera 203 (see, e.g., FIG. 2A and related discussion for further details). The first angled camera 201, the vertical camera 202, and the second angled camera 203 can include any particular high speed, high resolution, and/or high-sensitivity camera sensor able to capture high resolution area-scan images of the passing railcar. An area-scan image can be defined as an image that captures light from a complete area of a particular region of interest.

The first angled camera 201, the vertical camera 202, and the second angled camera 203 can capture area-scan images of the undercarriage of the passing railcar. For example, the first angled camera 201, the vertical camera 202, and the second angled camera 203 can be configured to capture area-scan images of a three-dimensional region of the undercarriage of the passing railcar. The first angled camera 201, the vertical camera 202, and the second angled camera 203 can capture area-scan images of specific regions of the undercarriage and/or specific components of the undercarriage. For example, the undercarriage area-scan inspection system 101 can capture area-scan images of the undercarriage of the passing railcar with a blur of less than 2 mm and of passing railcars moving at speeds up to 70 miles per hour (or faster). Though discussed as having three cameras, the undercarriage area-scan inspection system 101 can include more than three cameras or less than three cameras. For example, the undercarriage area-scan inspection system 101 can include various angled cameras and various vertical cameras, each placed at a different location of the undercarriage area-scan inspection system 101. Continuing this example, the various angled cameras can each be angled at different degrees to focus on different components of the undercarriage of the passing railcar.

The undercarriage line-scan inspection system 102 can include one or more cameras, lights, and/or sensors used to capture line-scan images of the undercarriage of the passing railcar. The undercarriage line-scan inspection system 102 can include a line-scan camera 301 (see, e.g., FIG. 3A and related discussion for further details). The line-scan camera 301 can include any particular high speed, high resolution, and/or high-sensitivity camera sensor able to capture high resolution line-scan images of the passing railcar. The line-scan camera 301 can capture line-scan images of the undercarriage of the passing railcar. A line-scan image can be defined as an image generated by a particular line-scan camera that captures a line of pixels and reconstructs the image by concatenating the various lines of pixels gathered of the passing railcar. For example, the line-scan camera 301 can be configured to capture line-scan images of a three-dimensional region of the undercarriage of the passing railcar. The line-scan camera 301 can capture line-scan images of specific regions of the undercarriage and/or specific components of the undercarriage. For example, the undercarriage line-scan inspection system 102 can capture line-scan images of the undercarriage of the passing railcar with a blur of less than 2 mm and of passing railcars moving at speeds up to 70 miles per hour (or faster).

Figure 2A:
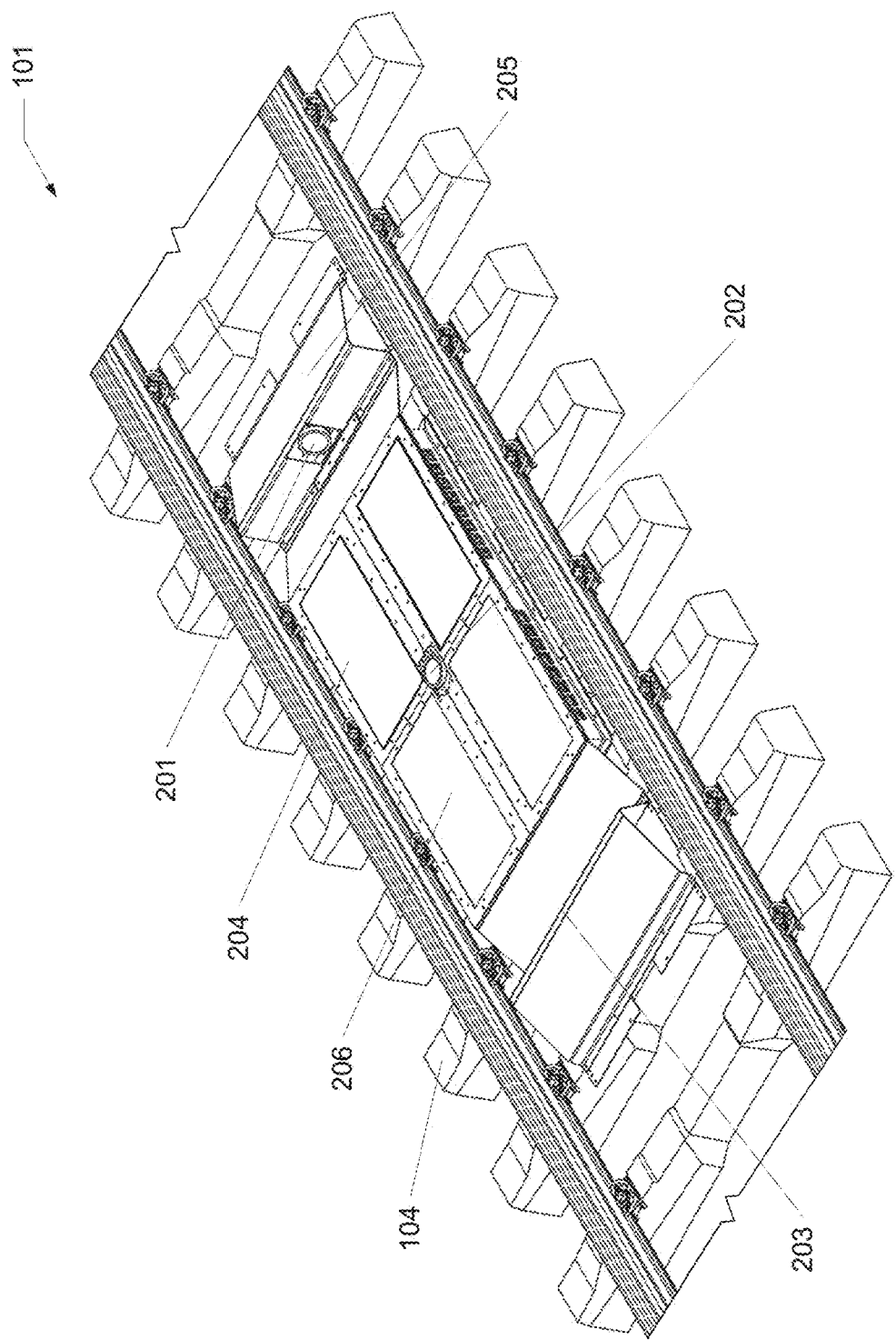
FIG. 2A illustrates an example perspective view of an installed undercarriage area-scan inspection system, in accordance with the disclosed technology.

Referring now to FIG. 2A, illustrated is a perspective view of the undercarriage area-scan inspection system 101 shown in use in a railroad track 103, in accordance with the disclosed technology. The undercarriage area-scan inspection system 101 can include the first angled camera 201, the vertical camera 202, and the second angled camera 203. The first angled camera 201, the vertical camera 202, and the second angled camera 203 can be directed to a specific three-dimensional space. Stated differently, the first angled camera 201, the vertical camera 202, and the second angled camera 203 can be targeted at a specific point such that the first angled camera 201, the vertical camera 202, and the second angled camera 203 are focused on one or more specific components, elements, and/or portions of a passing railcar.

The first angled camera 201 and/or the second angled camera 203 can be spaced apart from the vertical camera 202 a predetermined distance. For example, the first angled camera 201 and/or the second angled camera 203 can be spaced apart from the vertical camera 202 approximately 1 tie spacing, 1.5 tie spacings, 2 tie spacings, 2.5 tie spacings, 3 time spacings or any other distance (e.g., assuming the railway has 3000 ties per mile, the tie spacing can be approximately 21" middle-to-middle of adjacent ties, as a non-limiting example).

The first angled camera 201 and/or the second angled camera 203 can be configured to obtain images from first and second viewpoints, respectively. For example, first angled camera 201 and/or the second angled camera 203 can have an angle with respect to horizontal that is approximately 20 degrees, approximately 25 degrees, approximately 30 degrees, approximately 35 degrees, approximately 40 degrees, approximately 45 degrees, approximately 50 degrees, in a range between approximately 20 degrees and approximately 40 degrees, or in a range between approximately 40 degrees and approximately 60 degrees, as non-limiting examples.

Further, while the first angled camera 201 and the second angled camera 203 are shown as being angled upwardly, the disclosed technology is not so limited. For example, the first angled camera 201 and/or the second angled camera 203 can be positioned horizontally (e.g., parallel to ground) or substantially horizontally and can be directed at a mirror or other reflective surface (not pictured) to nonetheless obtain images from the first and second viewpoints, respectively.

Figure 2B:
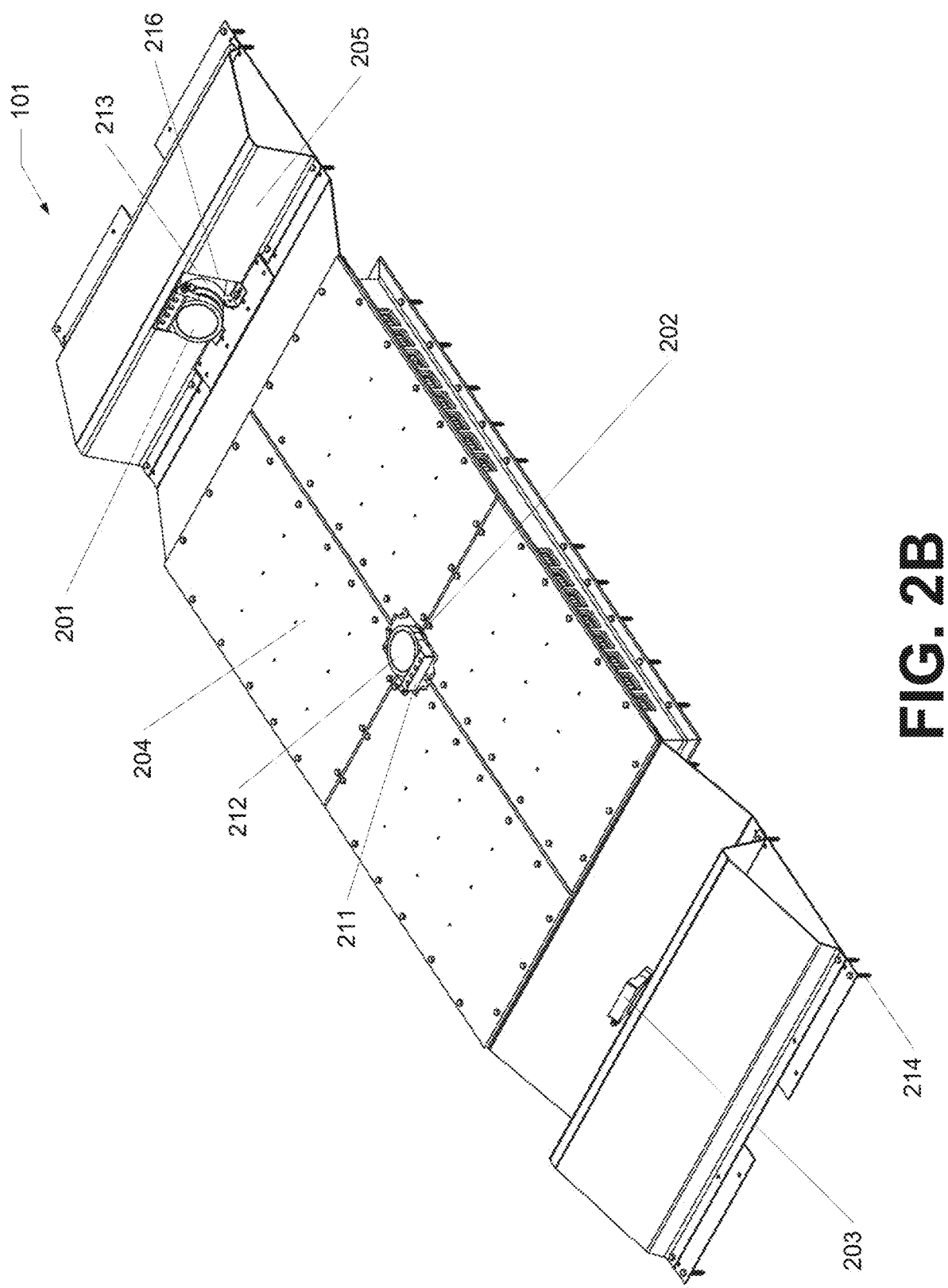
FIG. 2B illustrates a second example perspective view of an undercarriage area-scan inspection system, in accordance with the disclosed technology.

Each of the cameras of the undercarriage area-scan inspection system 101 can include a housing 213 and an air curtain apparatus 211 (see, e.g., FIG. 2B and related discussion for further details). The housings 213 of the cameras of the undercarriage area-scan inspection system 101 can protect the cameras during use as a passing railcar passes over the undercarriage area-scan inspection system 101. The air curtain apparatus 211 can generate air curtains over one or more lenses 212 (see, e.g., FIG. 2B and related discussion for further details) of each of the cameras such that debris does not obstruct or damage the lenses 212 of the cameras of the undercarriage area-scan inspection system 101. The first angled camera 201 and the second angled camera 203 can each include a protective cover 205 to protect the cameras during use. The undercarriage area-scan inspection system 101 cameras can generate area-scan images of the undercarriage of the passing railcar. The undercarriage area-scan inspection system 101 can include one or more lighting arrays 204. The lighting arrays 204 can be covered by lighting covers 206 to protect the lighting arrays 204 from debris during use. The lighting arrays 204 can illuminate the particular area of interest for data acquisition. The undercarriage area-scan inspection system 101 can be centered on the train track 103. Though illustrated as an array of LEDs, the lighting arrays 204 can have any particular configuration (e.g., a non array configuration).

Referring now to FIG. 2B, illustrated is an example perspective view of the undercarriage area-scan inspection system 101, in accordance with the disclosed technology. The undercarriage area-scan inspection system 101 can include the first angled camera 201, the vertical camera 202, the second angled camera 203, and the lighting arrays 204. The first angled camera 201, the vertical camera 202, the second angled camera 203, and the lighting array 204 can work in combination to capture area-scan images of the undercarriage of the passing railcar. For example, the lighting array 204 can trigger and illuminate the undercarriage of the passing railcar as the passing railcar travels above the undercarriage area-scan inspection system 101. On illuminating the undercarriage of the passing railcar as the passing railcar travels above the undercarriage area-scan inspection system 101, the first angled camera 201, the vertical camera 202, and the second angled camera 203 can each capture respective area-scan images of the undercarriage of the passing railcar. The illumination generated by the lighting array 204 can help reduce the blur generated when capturing area-scan images of the moving railcar.

As discussed in further detail herein, the first angled camera 201, the vertical camera 202, and the second angled camera 203 can each include the air curtain apparatus 211. The air curtain apparatus 211 can connect to a compressed air system (not pictured). The compressed air system can feed compressed air to the air curtain apparatus 211 to generate an air curtain. The air curtain can blow over the lenses 212 of the first angled camera 201, the vertical camera 202, and the second angled camera 203. The air curtain can blow any debris off the lenses 212 of the first angled camera 201, the vertical camera 202, and the second angled camera 203. The air curtain apparatus 211 can generate air within the housings 213 of the first angled camera 201, the vertical camera 202, and the second angled camera 203. By generating air within the housings 213 of the first angled camera 201, the vertical camera 202, the second angled camera 203, the air curtain apparatus 211 can help cool the internal components of the first angled camera 201, the vertical camera 202, the second angled camera 203.

Figure 2C:
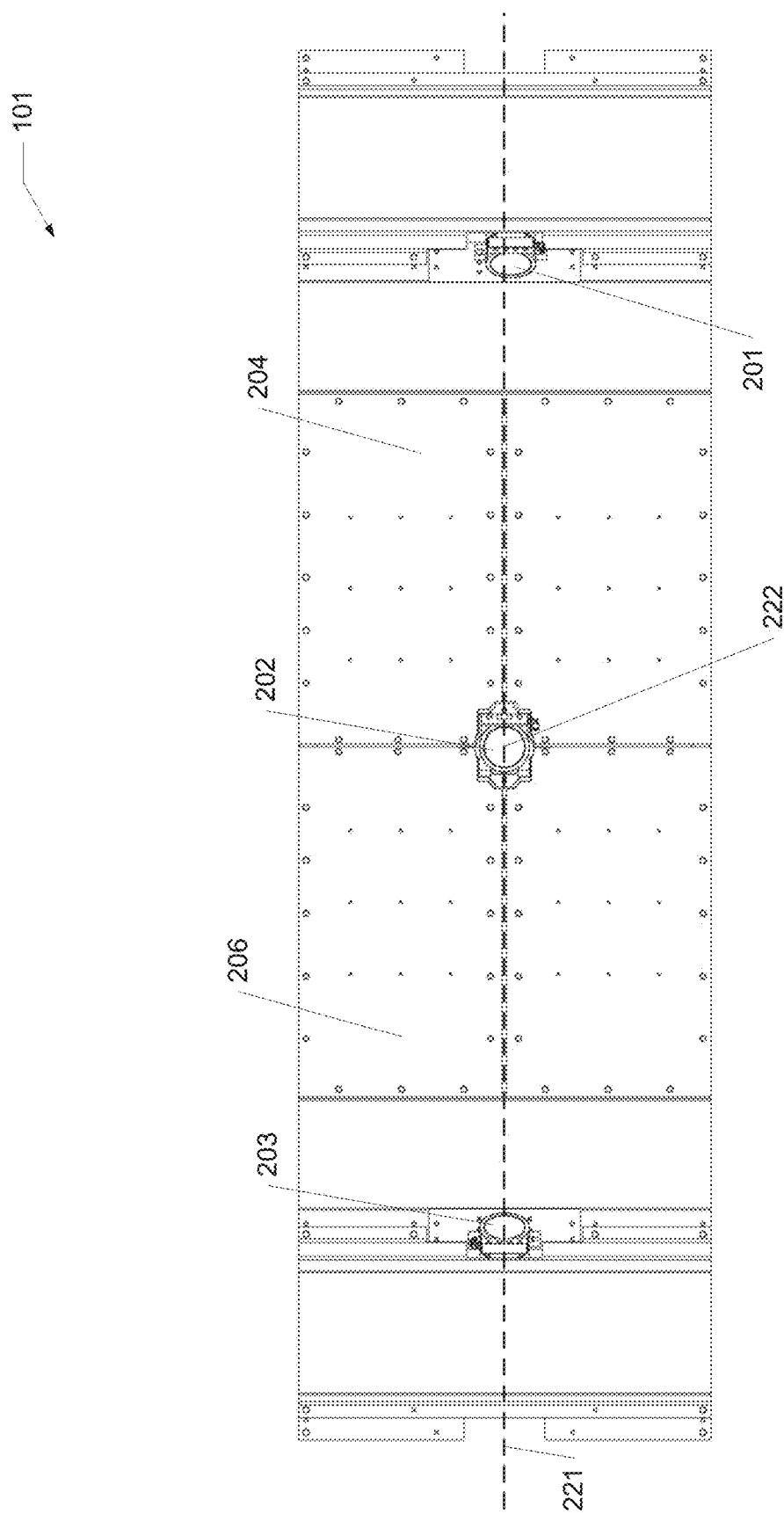
FIG. 2C illustrates a top view of an undercarriage area-scan inspection system, in accordance with the disclosed technology.
Figure 2D:
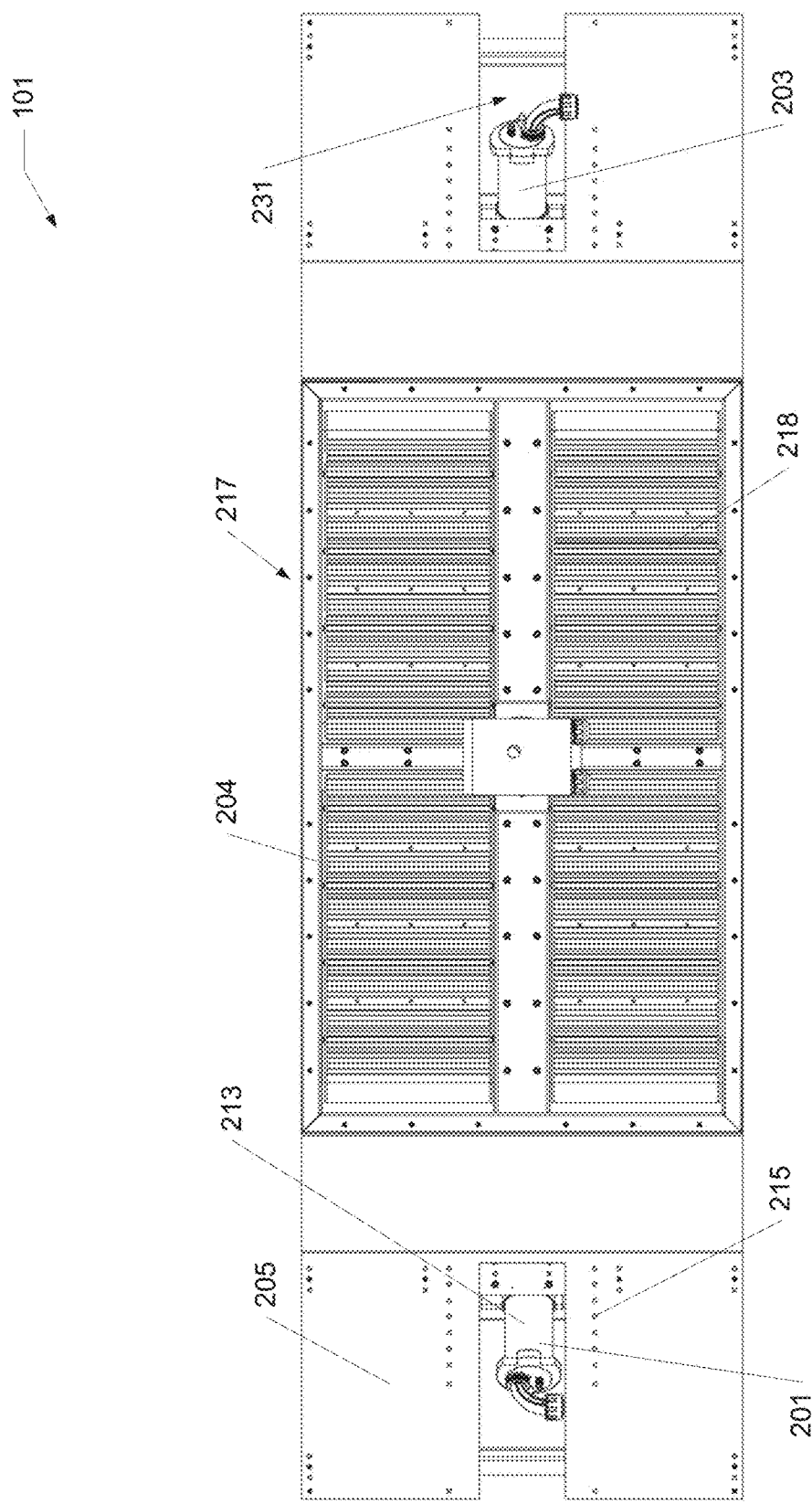
FIG. 2D illustrates a bottom view of an undercarriage area-scan inspection system, in accordance with the disclosed technology.
Figure 2E:
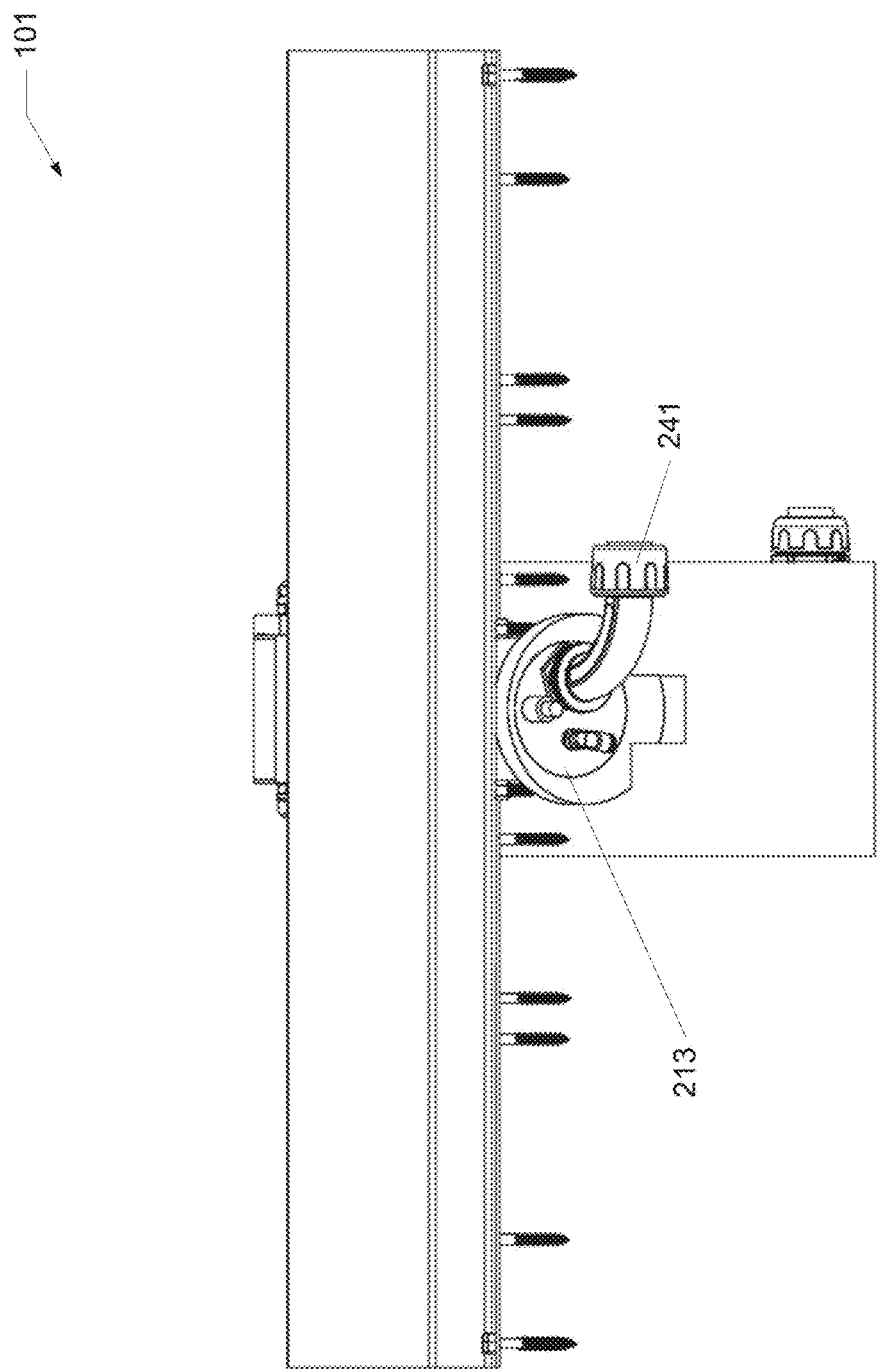
FIG. 2E illustrates a first side view of an undercarriage area-scan inspection system, in accordance with the disclosed technology.
Figure 2F:
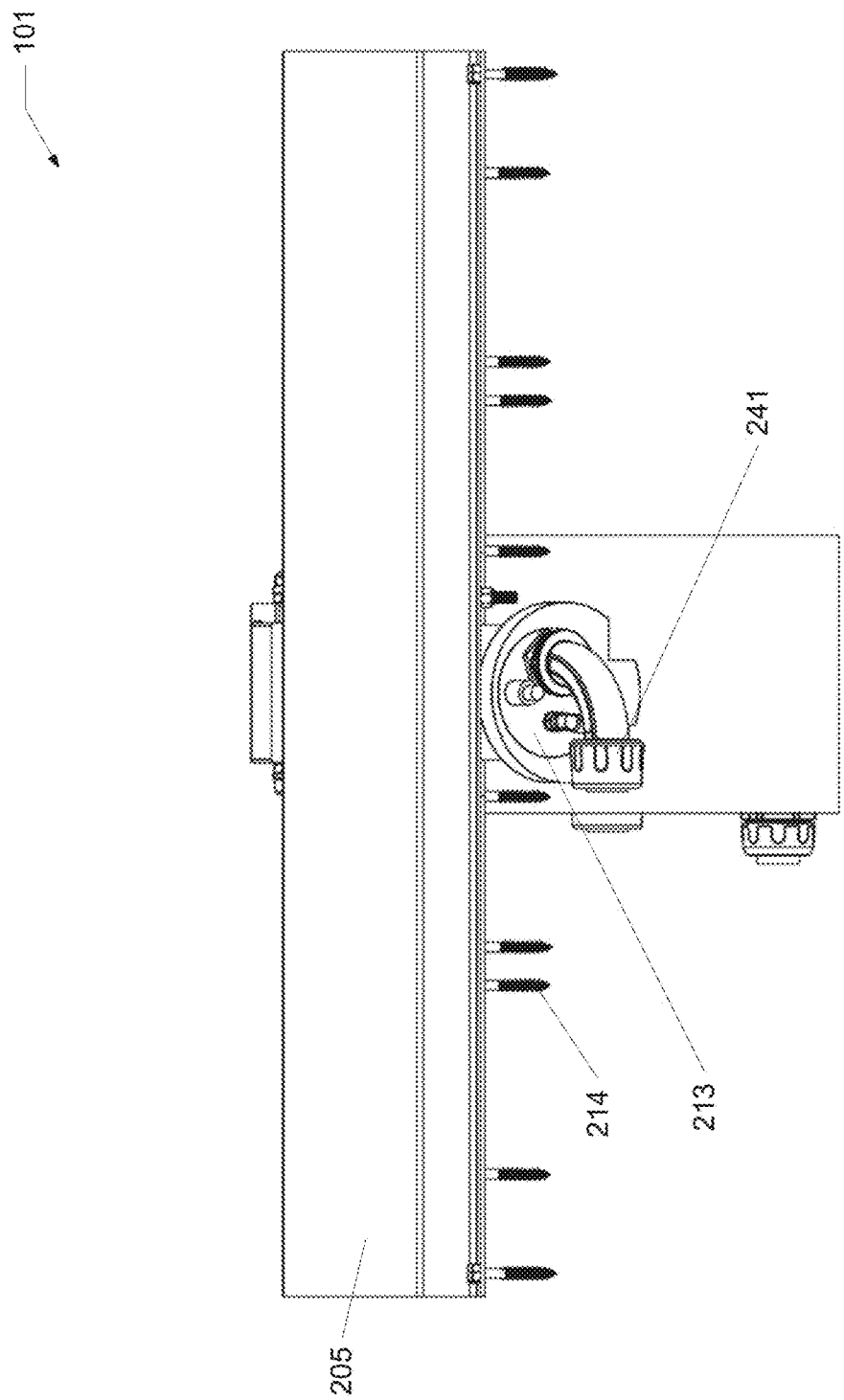
FIG. 2F illustrates a second side view of an undercarriage area-scan inspection system, in accordance with the disclosed technology.
Figure 2G:
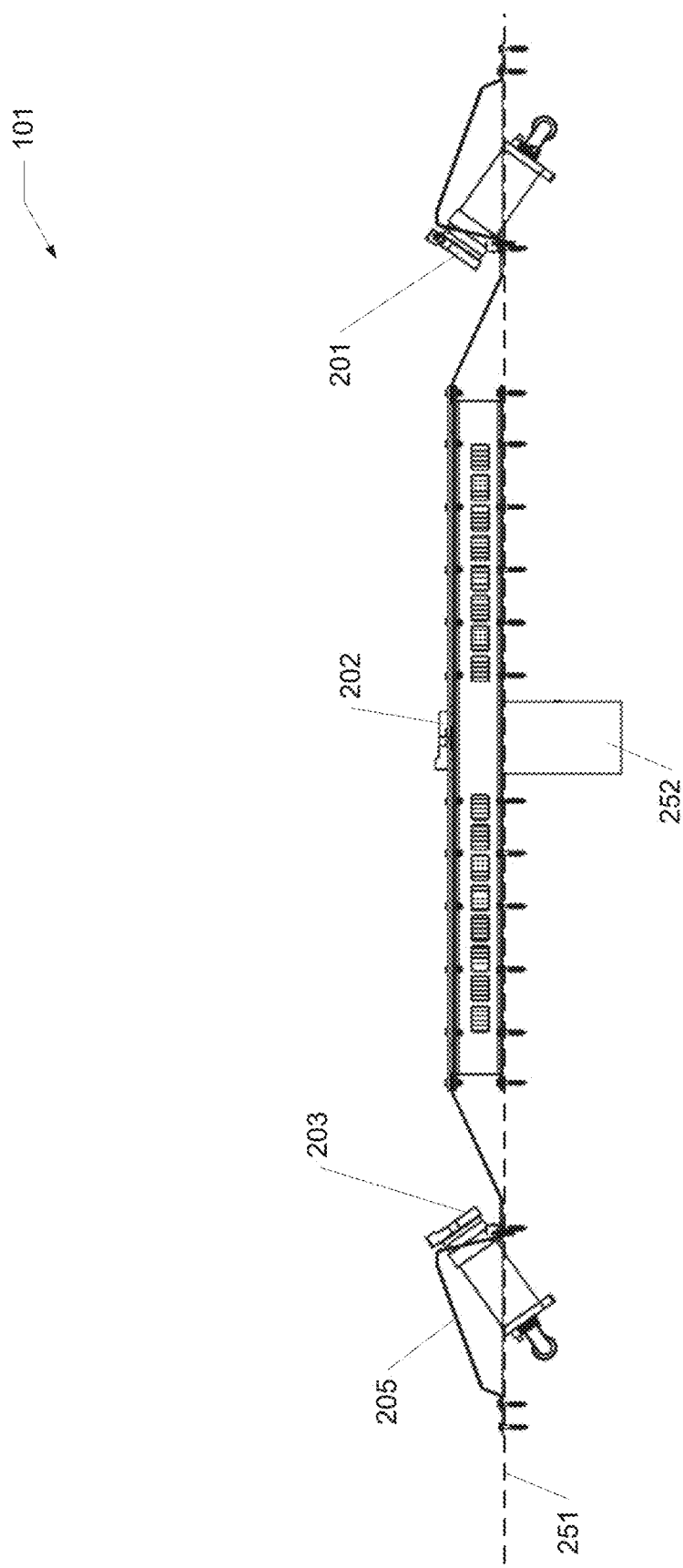
FIG. 2G illustrates a third side view of an undercarriage area-scan inspection system; in accordance with the disclosed technology.
Figure 2H:
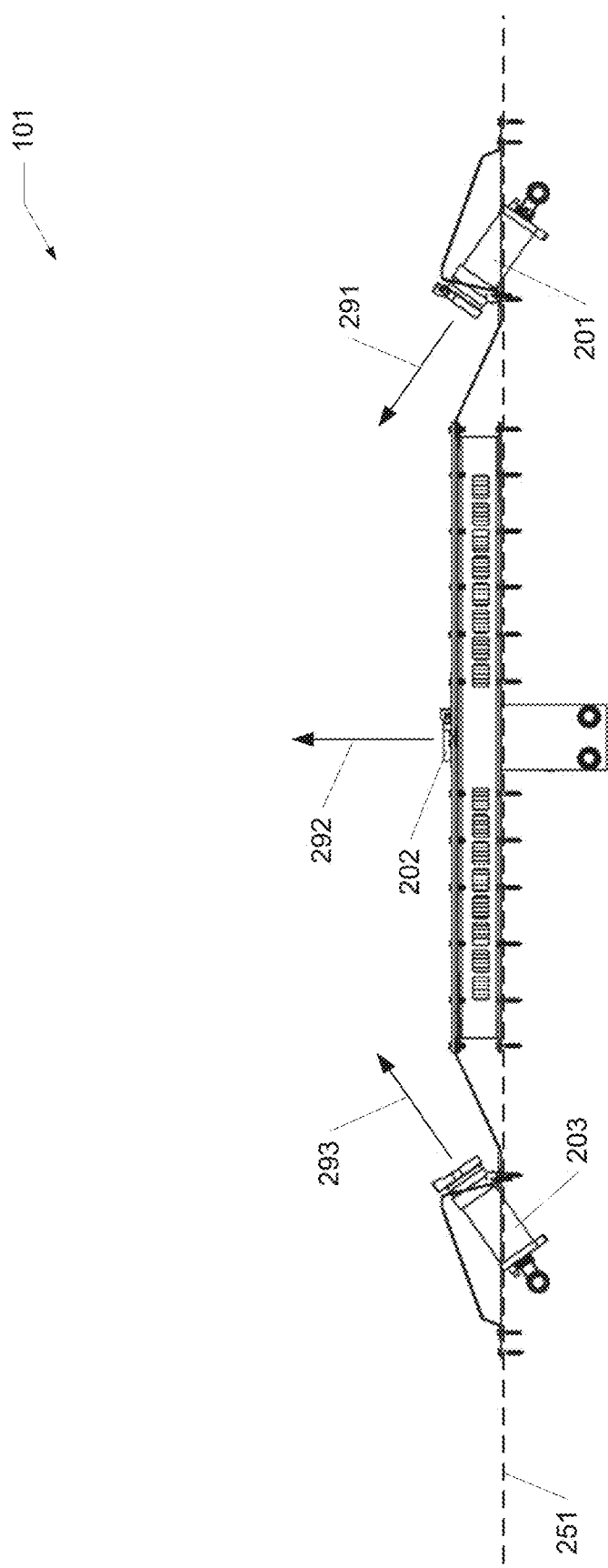
FIG. 2H illustrates a fourth side view of an undercarriage area-scan inspection system, in accordance with the disclosed technology.
Figure 2J:
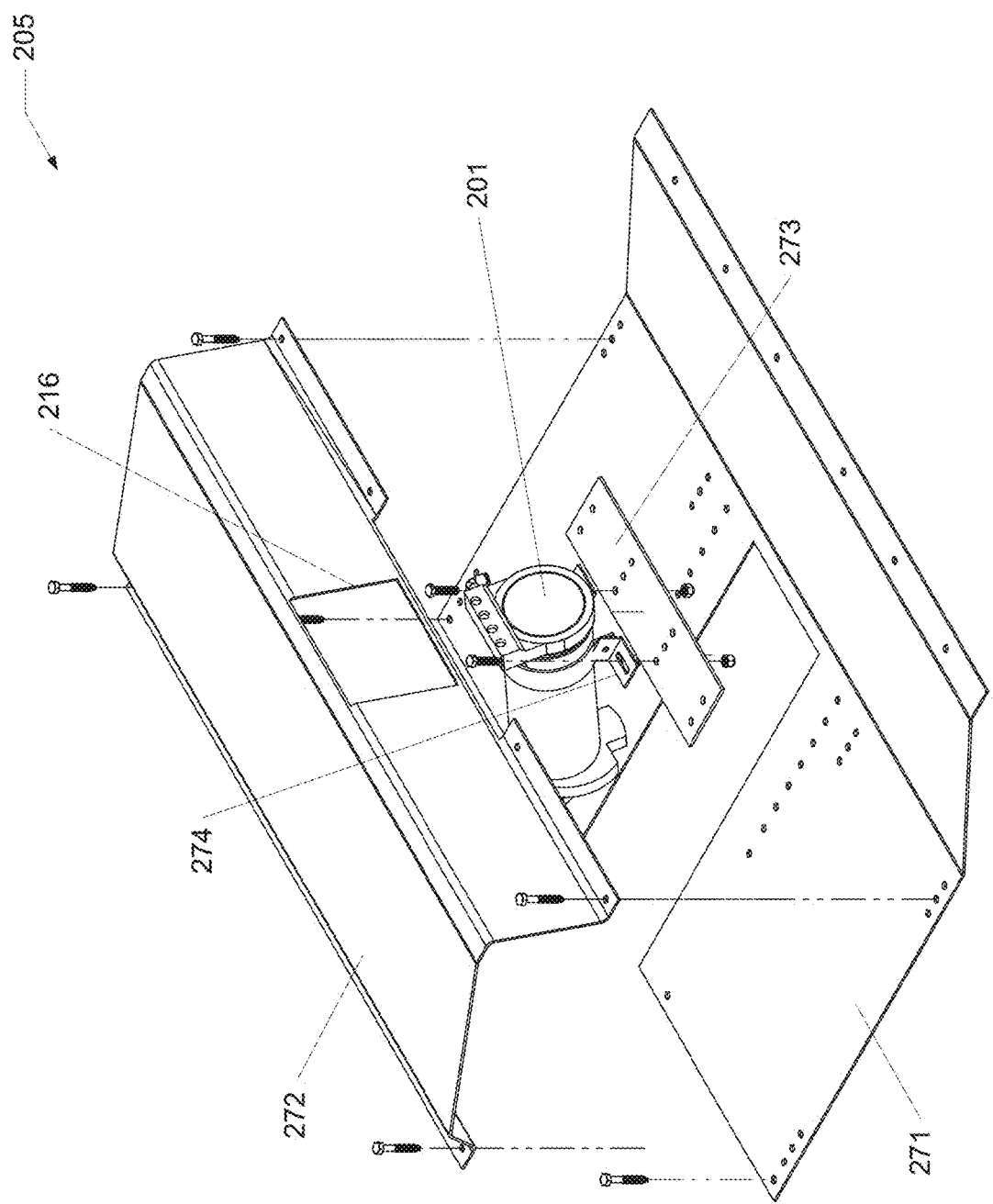
FIG. 2J, illustrates an exploded view of a protective cover, in accordance with the disclosed technology.
Figure 2K:
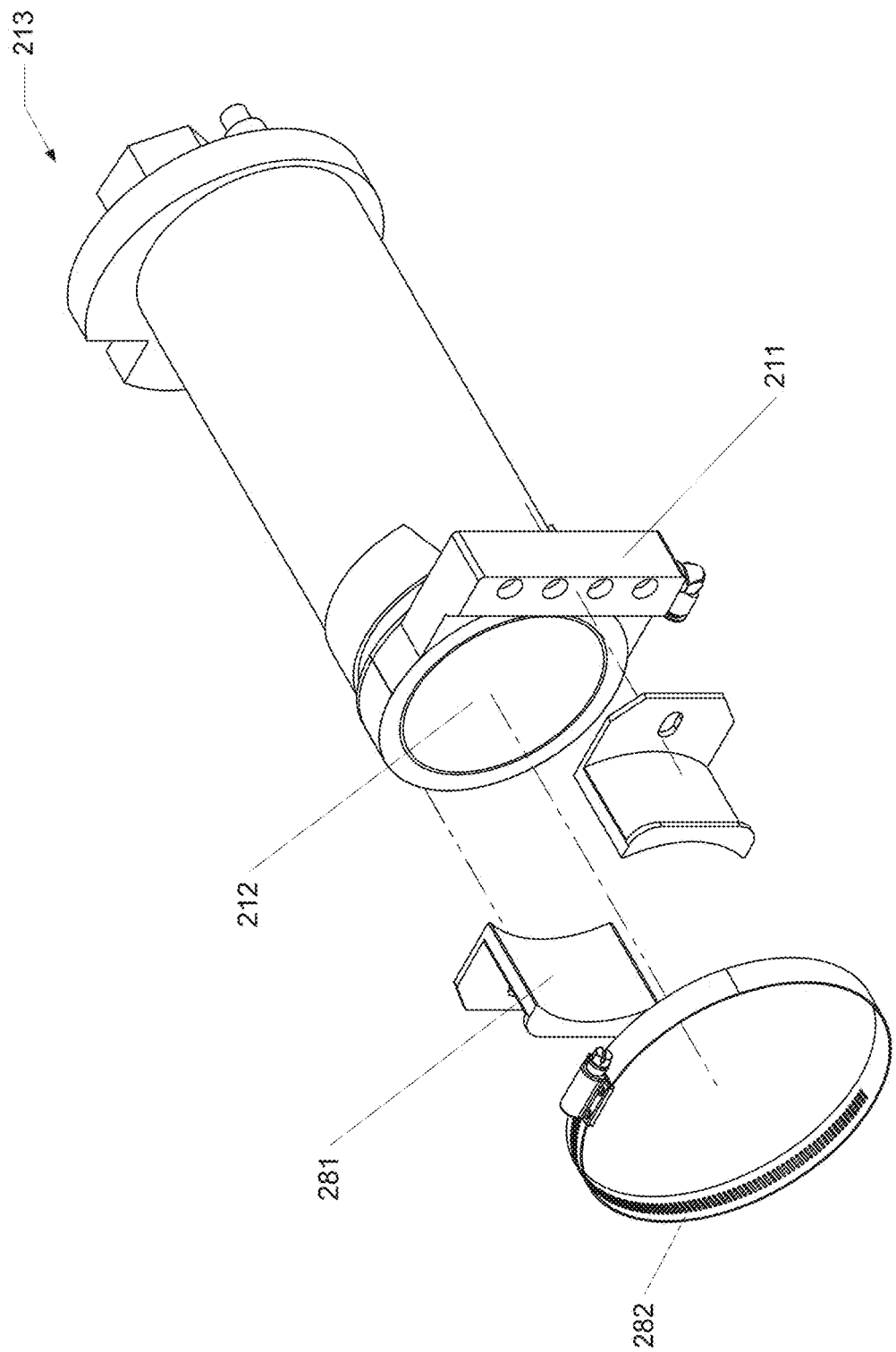
FIG. 2K, illustrates an exploded view of a housing, in accordance with the disclosed technology.

The housings 213 can function as a protective housing for the camera sensors of the first angled camera 201, the vertical camera 202, and the second angled camera 203 (see FIG. 2K for further details). The housings 213 can include any particular material that can protect the camera sensors of the first angled camera 201, the vertical camera 202, and the second angled camera 203 during use. For example, the housings 213 can be constructed from steel, stainless steel, iron, polymer, plastic, and/or any particular type of material.

The protective cover 205 can include a camera opening 216. The camera opening 216 can include a cutout portion of the protective cover 205. The first angled camera 201 and the second angled camera 203 can partially and/or fully extend through the camera opening 216. The first angled camera 201 and the second angled camera 203, alternatively, can be fully contained within the protective cover 205. The camera opening 216 can allow the first angled camera 201 and the second angled camera 203 to capture images of the passing railcar while still being partially or fully confined by the protective cover 205 for protection from debris. The protective cover 205 can be manufactured from steel, carbon fiber, and/or any particular material that can withstand the impact of debris generated by the passing railcar.

The undercarriage area-scan inspection system 101 can include one or more attachment means (e.g., screws) 214. The attachment means 214 can secure the undercarriage area-scan inspection system 101 to the rail ties 104. Though illustrated as screws 214, any particular similar fixing mechanism can be used to secure the undercarriage area-scan inspection system 101 to the rail ties 104. For example, the screws 214 can be replaced and/or supplemented with lag bolts, bolts, ties, pins, and/or any other applicable appending system.

Referring now to FIG. 2C, illustrated is a top view of the undercarriage area-scan inspection system 101, in accordance with the disclosed technology. The undercarriage area-scan inspection system 101 can include a central axis 221. The central axis 221 can symmetrically bisect the undercarriage area-scan inspection system 101. For example, the central axis 221 can pass through the center of the first angled camera 201, the vertical camera 202, and the second angled camera 203. The first angled camera 201, the vertical camera 202, and the second angled camera 203 can each have distinct alignments relative to the central axis 221 such that each of the cameras can capture distinct features of the undercarriage of the passing railcar.

The undercarriage area-scan inspection system 101 can include four or more lighting arrays 204 and respective lighting covers 206. As currently illustrated, the lighting arrays 204 can be found beneath the lighting covers 206 (see FIG. 2I for an exploded view of the undercarriage area-scan inspection system 101 and the corresponding lighting arrays 204). The lighting arrays 204 can include 140,000-lumen LED lights and/or any other similar lighting system capable of illuminating the undercarriage of the passing railcar. Though illustrated as having four lighting arrays 204, any particular combination of lighting arrays 204 can be employed to illuminate the undercarriage of the passing railcar. The lighting arrays 204 can each be configured adjacently such that a respective corner of each of the lighting arrays 204 can converge to a central vertex 222. The vertical camera 202 can be centered on the central vertex 222. The vertical camera 202 can be placed at any location of the undercarriage area-scan inspection system 101. The vertical camera 202 can include more than one camera positioned at different locations of the undercarriage area-scan inspection system (e.g., one at each corner of the lighting arrays 204).

Referring now to FIG. 2D, illustrated is a bottom view of the undercarriage area-scan inspection system 101, in accordance with the disclosed technology. The protective cover 205 of the undercarriage area-scan inspection system 101 can include a recess 231. The recess 231 can allow for the housing 213 of the first angled camera 201 and the second angled camera 203 to extend through the protective cover 205. The protective cover 205 can include one or more fixing apertures 215. The fixing apertures 215 can receive one or more screws, bolts, and/or other fixing mechanisms to fix the undercarriage area-scan inspection system 101 to the rail ties 104. The protective cover 205 can have more fixing apertures 215 than necessary such that one or more screws 214 can be inserted in various locations depending on the geometric configuration of the train track 103. The underside 217 of the undercarriage area-scan inspection system 101 can be substantially flat. By being completely flat, the underside 217 of the undercarriage area-scan inspection system 101 can sit flush to a top surface of each of the rail ties 104. The lighting arrays 204 can include one or more back plates 218 that can protect the underside of the undercarriage area-scan inspection system 101.

Referring now to FIG. 2E, illustrated is a first side view of the undercarriage area-scan inspection system 101, in accordance with the disclosed technology. The undercarriage area-scan inspection system 101 can include one or more conduit adapters 241. The conduit adapter 241 can allow for one or more wires and/or compressed air lines to extend into the housing 213 while maintaining a watertight configuration. For example, the housing 213 of the second angled camera 203 can include a conduit adapter 241.

Referring now to FIG. 2F, illustrated is a second side view of the undercarriage area-scan inspection system 101, in accordance with the disclosed technology. The undercarriage area-scan inspection system 101 can include the one or more conduit adapters 241. The conduit adapter 241 can allow for one or more wires and/or compressed air lines to extend into the housing 213 while maintaining a watertight configuration. For example, the housing 213 of the first angled camera 201 can include a conduit adapter 241. The one or more screws 214 can extend through the protective cover 205 to attach to the one or more rail ties 104.

Referring now to FIG. 2G, illustrated is a third side view of the undercarriage area-scan inspection system 101, in accordance with the disclosed technology. The undercarriage area-scan inspection system 101 can include a vertical camera enclosure 252. The vertical camera enclosure 252 can contain the vertical camera 202 and its associated housing 213. The undercarriage area-scan inspection system 101 can include a horizontal plane 251. The horizontal plane 251 can represent the top surface of one or more rail ties 104 that support the undercarriage area-scan inspection system 101. The vertical camera enclosure 252 of the undercarriage area-scan inspection system 101 can extend through the horizontal plane 251. For example, the vertical camera enclosure 252 can be positioned between two rail ties 104 and can partially extend below the horizontal plane 251. The first angled camera 201 and the second angled camera 203 can partially extend below the horizontal plane 251. For example, the first angled camera 201 and the second angled camera 203 can partially extend below the horizontal plane 251 into a particular cavity between two particular rail ties 104.

Referring now to FIG. 2H, illustrated is a fourth side view of the undercarriage area-scan inspection system 101, in accordance with the disclosed technology. The vertical camera 202 can capture area-scan images in a vertical direction 292. For example, the vertical camera 202 can capture area-scan images in the vertical direction 292 of a particular area and/or component of the undercarriage of the passing railcar. The first angled camera 201 and the second angled camera 203 can capture isometric area-scan images in a first direction 291 and the second direction 293, respectively. For example, the first angled camera 201 and the second angled camera 203 can capture isometric area-scan images in the first direction 291 and the second direction 293 of the undercarriage of the passing railcar.

The first direction 291 and the second direction 293 can form a first angle and a second angle relative to the horizontal plane 251. The first angle can define the angulation of the first angled camera 201 relative to the horizontal plane 251 and the second angle can define the angulation of the second angled camera 203 relative to the horizontal plane 251. The angle between the first angled camera 901 and the horizontal plane 951 and/or between the second angled camera 903 and the horizontal plane 951 can be at least 15 degrees, between approximately 0 and approximately 15 degrees, between approximately 15 and approximately 25 degrees, between approximately 25 and approximately 35 degrees, between approximately 35 and approximately 45 degrees, between approximately 45 and approximately 60 degrees, approximately 15 degrees, approximately 30 degrees, approximately 45 degrees, or any other desired angle.

Referring now to FIG. 2I, illustrated is a partially exploded view of the undercarriage area-scan inspection system 101, in accordance with the disclosed technology. The undercarriage area-scan inspection system 101 can include four or more lighting arrays 204 configured in an adjacent structure. The lighting arrays 204 can be inserted into an undercarriage area-scan inspection system frame 261. For example, the undercarriage area-scan inspection system frame 261 can include one or more lighting array recesses 262. For example, the undercarriage area-scan inspection system 101 can include a two lighting array configuration, where the vertical camera 202 is positioned in the middle of the two lighting arrays. In another example, the undercarriage area-scan inspection system 101 can include a single lighting configuration, where the vertical camera 202 is positioned in the center of a single lighting device. The lighting array recesses 262 can receive the lighting arrays 204. Once inserted, the lighting covers 206 can cover the lighting arrays 204. One or more screws 263, bolts, lag bolts, welding points, and/or any other appending mechanism can secure the lighting covers 206 to the undercarriage area-scan inspection system frame 261, thus securing the lighting array 204 within the undercarriage area-scan inspection system frame 261.

The undercarriage area-scan inspection system frame 261 can include a vertical camera opening 264. The vertical camera opening 264 can allow the vertical camera 202 to extend through the undercarriage area-scan inspection system frame 261 into the vertical camera enclosure 252. The vertical camera enclosure 252 and the vertical camera 202 can fix the undercarriage area-scan inspection system frame 261 using one or more screws, bolts, lag bolts, and/or any other appropriate fixing mechanism.

Referring now to FIG. 2J, illustrated is an exploded view of the protective cover 205, in accordance with the disclosed technology. The protective cover 205 can protect the first angled camera 201 and the second angled camera 203 from debris generated by the passing railcar. The protective cover 205 can include a bottom portion 271 and a top portion 272. The bottom portion 271 and the top portion 272 can attach together to form the protective cover 205. The first angled camera 201 and/or the second angled camera 203 can attach to a camera attachment point 273 through one or more camera ties 274. For example, the camera ties 274 can encircle the first angled camera 201 and/or the second angled camera 203. One or more screws can secure the first angled camera 201 and/or the second angled camera 203 to the camera attachment point 273 by extending through the camera ties 274 and the camera attachment point 273. Once secured to the camera attachment point 273, the first angled camera 201 and/or the second angled camera 203 can attach to the bottom portion 271 of the protective cover 205. The top portion 272 can attach to the bottom portion 271 such that the first angled camera 201 and/or the second angled camera 203 is aligned with the camera opening 216.

Referring now to FIG. 2K, illustrated is an exploded view of the camera housing 213, in accordance with the disclosed technology. The housing 213 can function as a protective environment for the camera sensor of the first angled camera 201, the second angled camera 203, and the vertical camera 202. The housing 213 can be manufactured from steel and/or any other material that provides adequate protection to the camera sensors from debris generated from the passing railcar. The housing 213 can include the air curtain apparatus 211 and the lens 212. The lens 212 can cover the camera sensor of the first angled camera 201, the second angled camera 203, and/or the vertical camera 202. The air curtain apparatus 211 can generate an air curtain over the lens 212 to clean the lens 212 from any debris collected from the passing railcar. The housing 213 can include one or more attachment elements 281. The attachment elements 281 can be integrated into the housing 213 (e.g., welded, molded, etc.) and/or attached to the housing using a tie 282. The attachment elements 281 can function to attach the vertical camera 202 to the undercarriage area-scan inspection system frame 261.

Figure 3A:
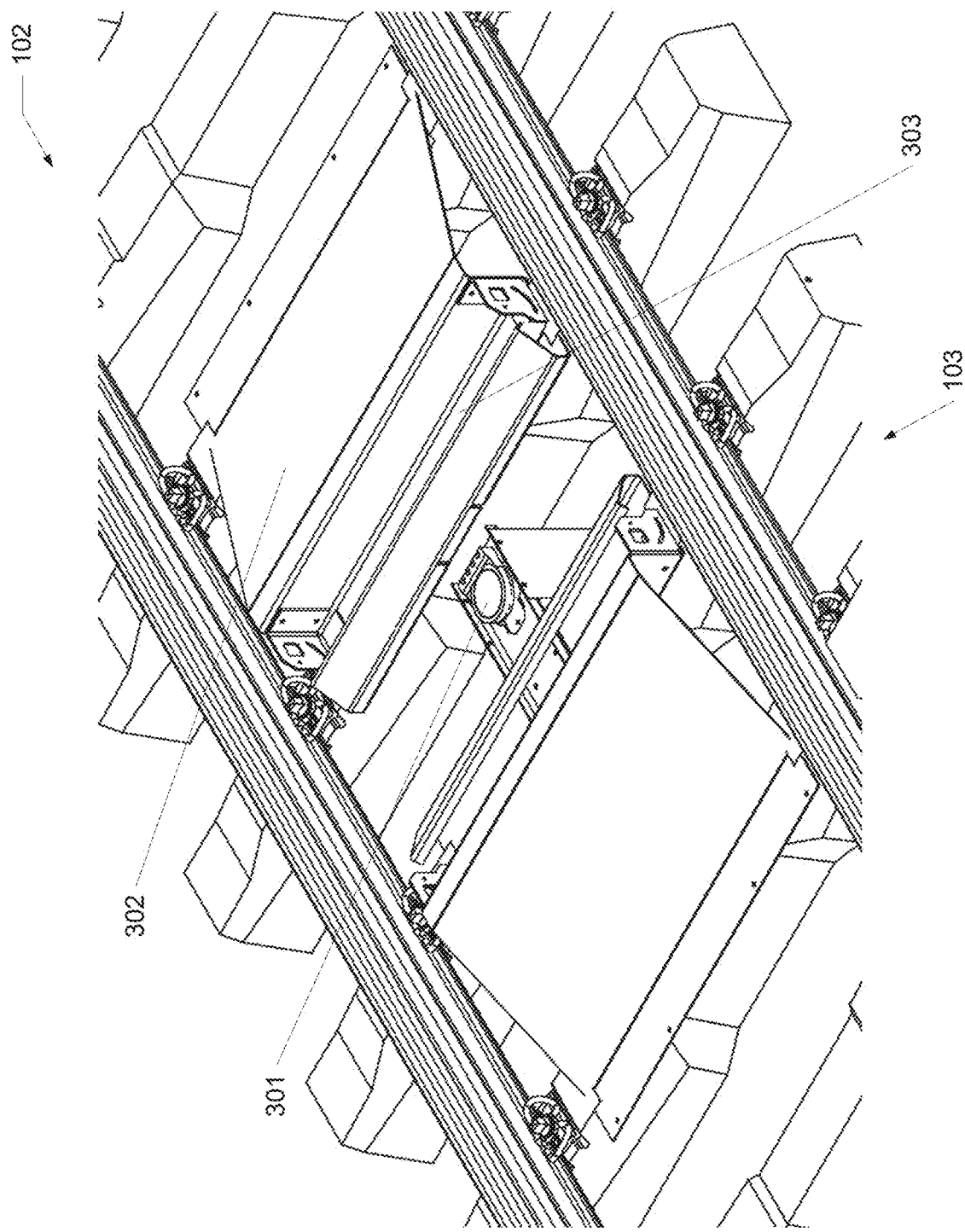
FIG. 3A illustrates an example perspective view of an installed undercarriage line-scan inspection system, in accordance with the disclosed technology.

Referring now to FIG. 3A, illustrated is a perspective view of the undercarriage line-scan inspection system 102, in accordance with the disclosed technology. The undercarriage line-scan inspection system 102 can generate line-scan images of the undercarriage of the passing railcar. A line scan image can differ from an area-scan image in that the sensor of a line-scan camera captures light in a single line and reconstructs the image by combining consecutive captures (e.g., lines) into one image, while an area-scan camera captures particular light from a target area. The undercarriage line-scan inspection system 102 can include the line-scan camera 301. The line-scan camera 301 can be directed to a specific three-dimensional space. Stated differently, the line-scan camera 301 can be targeted at a specific point such that the corresponding line-scan camera 301 is focused on one or more specific components, elements, and/or portions of a passing railcar. The line-scan camera 301 can be positioned below the level of the train track 103 and can be perpendicular to the ground. The line-scan camera 301 can aim directly upwards and record line-scan images of the undercarriage of the passing railcar. The undercarriage line-scan inspection system 102 can include one or more shields 302. The one or more shields 302 can protect the line-scan camera 301 from debris while a particular railcar passes over the undercarriage line-scan inspection system 102. The one or more shields 302 can include an angled lighting strip 303. The angled lighting strip 303 can illuminate the undercarriage of the passing railcar vertically and/or at a particular angle as it passes over the undercarriage line-scan inspection system 102. The angled lighting strip 303 can illuminate a region of the undercarriage of the passing railcar as the line-scan camera 301 captures line-scan images of the particular railcar.

Figure 3B:
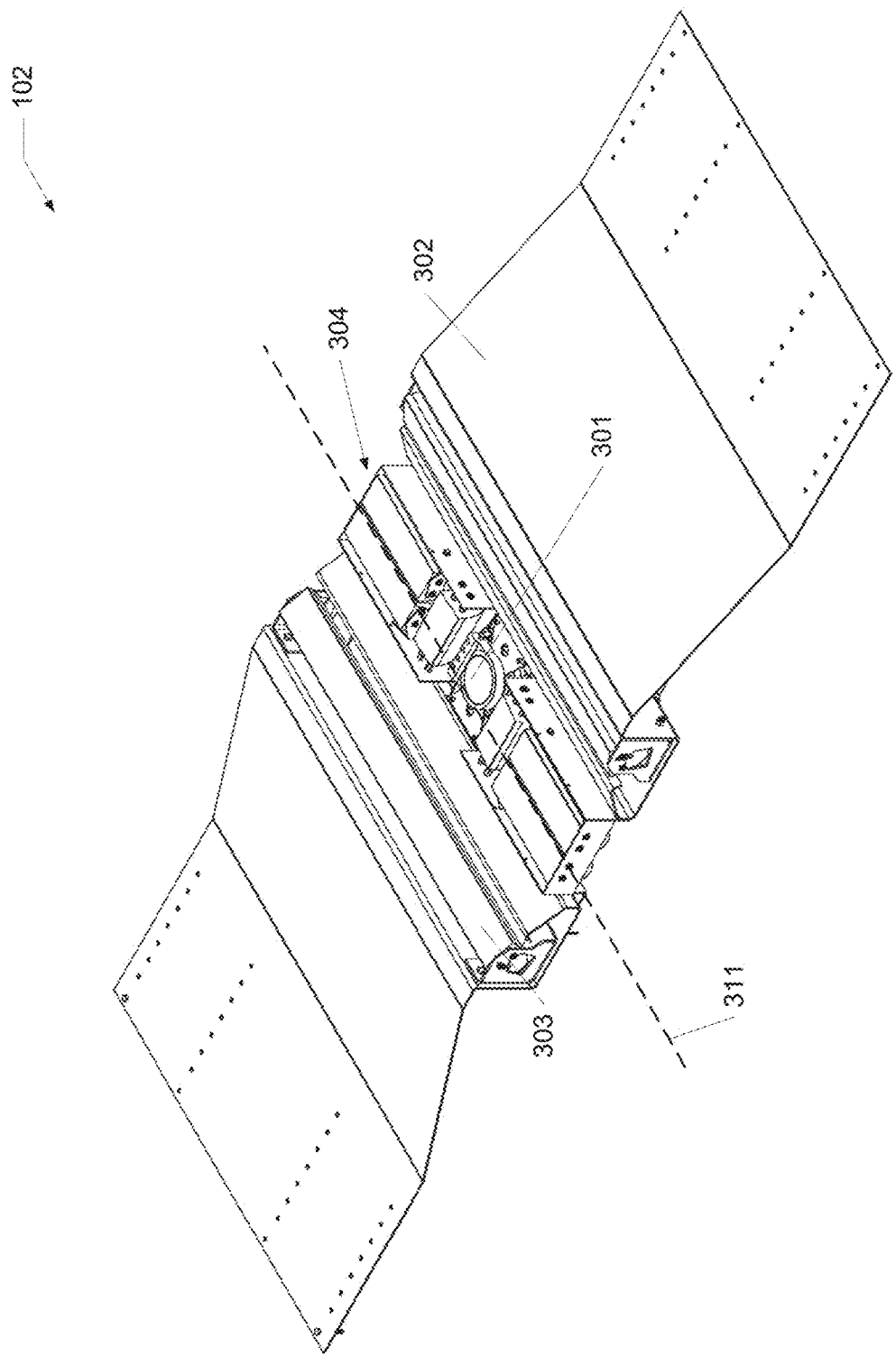
FIG. 3B illustrates an example perspective view of an undercarriage line-scan inspection system, in accordance with the disclosed technology.

Referring now to FIG. 3B, illustrated is an example perspective view of the undercarriage line-scan inspection system 102, in accordance with the disclosed technology. The undercarriage line-scan inspection system 102 can include the line-scan camera 301, one or more angled lighting strips 303, and one or more vertical lighting assemblies 304. The line-scan camera 301 can point vertically and collect line-scan images of the undercarriage of the passing railcar. The angled lighting strips 303 can illuminate the undercarriage of the passing railcar at a specific angle. The vertical lighting assemblies 304 can illuminate vertically towards the undercarriage of the passing railcar. The angled lighting strips 303 and the vertical lighting assemblies 304 can simultaneously trigger on the detection of the passing railcar. The angled lighting strips 303 and the vertical lighting assemblies 304 can illuminate the undercarriage of the passing railcar while the line-scan camera 301 gathers line-scan images of the undercarriage of the passing railcar. For example, the angled lighting strips 303 and the vertical lighting assemblies 304 can generate 140,000 lumens of light to illuminate the undercarriage of the passing railcar. Continuing this example, the line-scan camera 301 can include a high-speed, high resolution, and high sensitivity camera sensor able to capture line-scan images of the undercarriage of the passing railcar as the angled lighting strips 303 and the vertical lighting assemblies 304 illuminate the desired area of capture. The line-scan camera can gather line-scan images with less than 2 mm of blur of trains moving at speeds of up to 70 miles per hour, or faster (though the line-scan camera can capture line-scan images of the particular railcar passing at any speed).

The undercarriage line-scan inspection system 102 can include a first axis 311. The first axis 311 can bisect the undercarriage line-scan inspection system 102 such that the undercarriage line-scan inspection system 102 is symmetrically divided. For example, the undercarriage line-scan inspection system 102 can include two vertical lighting assemblies 304, two angled lighting strips 303, and two shields on both sides of the vertical axis. The line-scan camera 301 can be centered about the undercarriage line-scan inspection system 102 and the first axis 311.

Figure 3C:
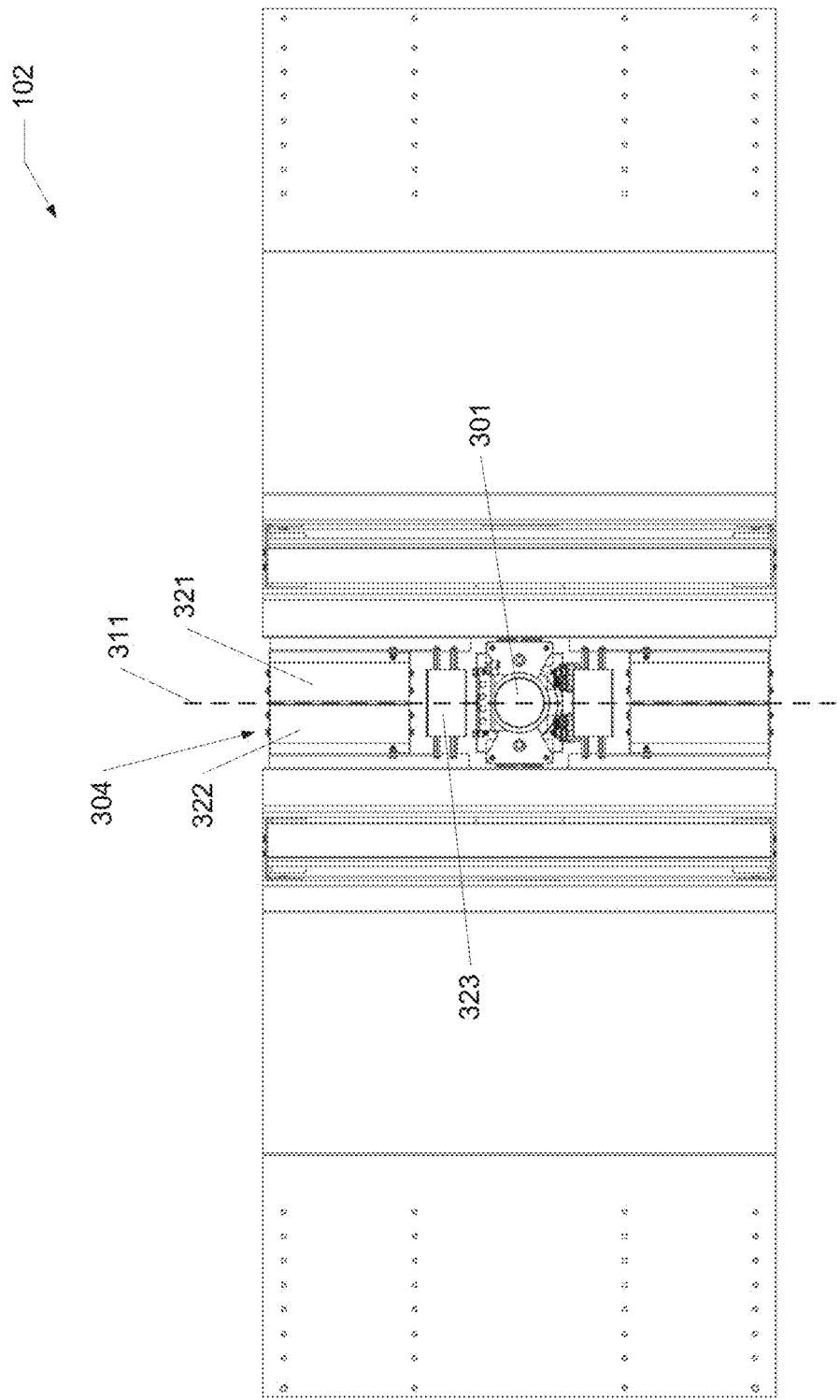
FIG. 3C illustrates an example top view of an undercarriage line-scan inspection system, in accordance with the disclosed technology.

Referring now to FIG. 3C, illustrated is an example top view of the undercarriage line-scan inspection system 102, in accordance with the disclosed technology. The line-scan camera 301 can be centered about the undercarriage line-scan inspection system 102. The vertical lighting assemblies 304 can include a first light 321, a second light 322, and a third light 323. The first light 321 and the second light 322 can be arranged parallel to the first axis 311. The third light 323 can be arranged perpendicularly to the first axis 311. The first light 321 and the second light 322 can be angled vertically (e.g., vertically relative to the ground) towards the undercarriage of the passing railcar. The third light 323 can be angled inwards towards the line-scan camera 301 such that a particular region above the line-scan camera 301 is adequately illuminated.

Figure 3D:
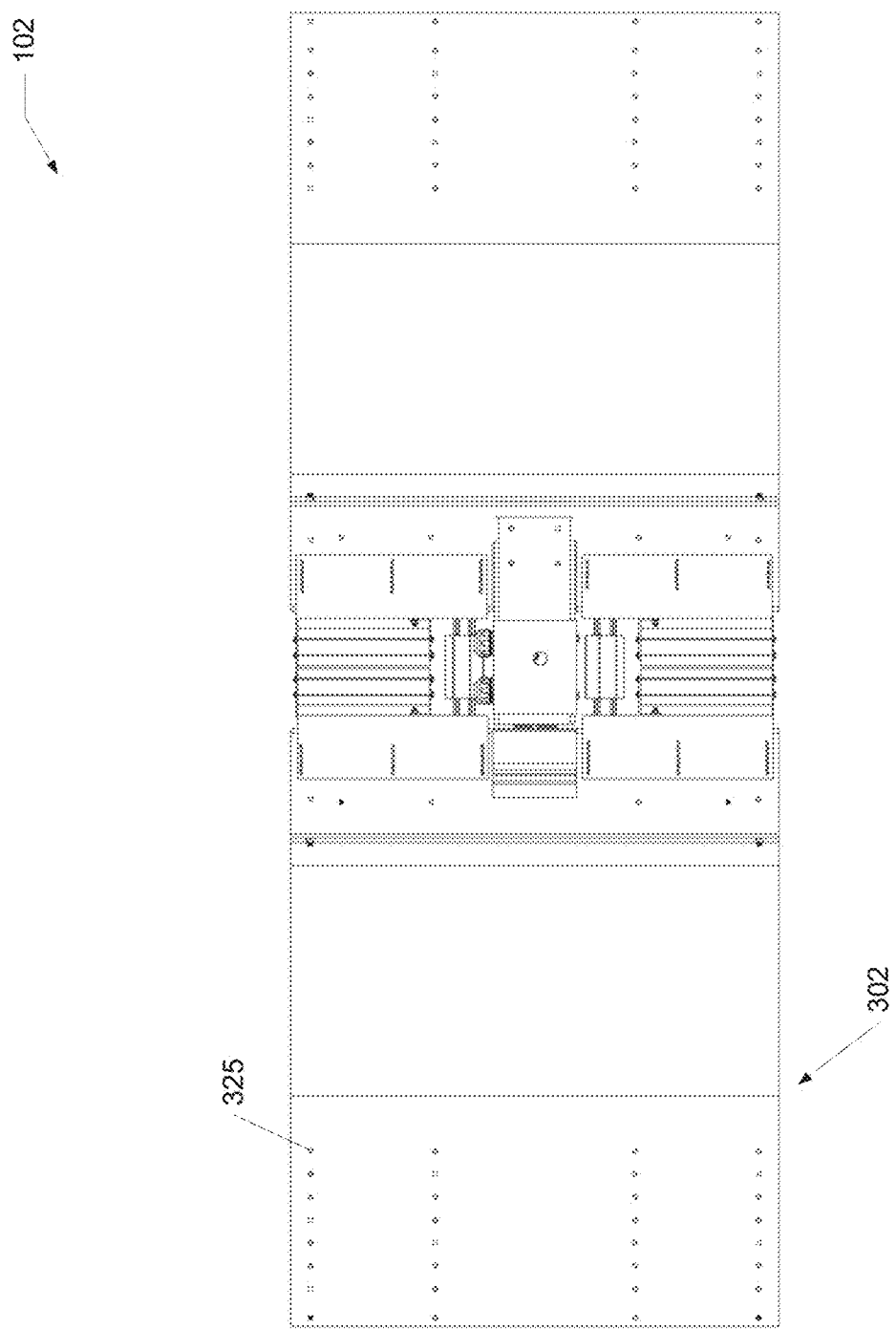
FIG. 3D illustrates an example bottom view of an undercarriage line-scan inspection system, in accordance with the disclosed technology.

Referring now to FIG. 3D, illustrated is an example bottom view of the undercarriage line-scan inspection system 102, in accordance with the disclosed technology. The one or more shields 302 can include one or more attachment apertures 325. The attachment apertures 325 can receive one or more screws, bolts, lag bolts, and/or any other adequate attachment mechanism for securing the undercarriage line-scan inspection system 102 to the rail ties 104. The attachment apertures 325 can be arranged such that any particular attachment aperture 325 can be used to secure the undercarriage line-scan inspection system 102 to the rail ties 104. For example, to accommodate for a distinct train track 103 geometry, any particular combination of attachment apertures 325 can be used to secure the undercarriage line-scan inspection system 102 to the train track 103.

Figure 3E:
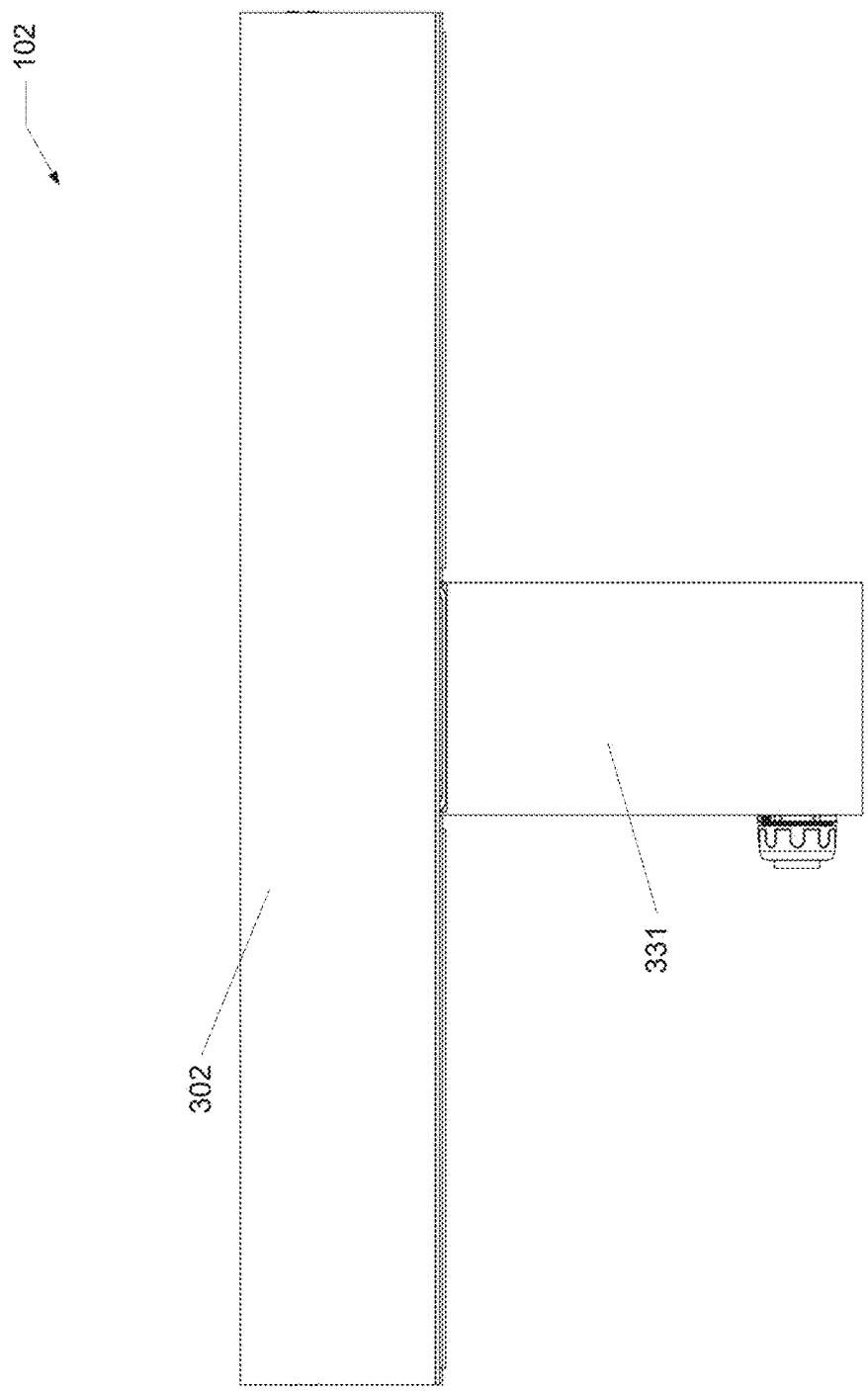
FIG. 3E illustrates an example first side view of an undercarriage line-scan inspection system, in accordance with the disclosed technology.

Referring now to FIG. 3E, illustrated is an example first side view of the undercarriage line-scan inspection system 102, in accordance with the disclosed technology. The undercarriage line-scan inspection system 102 can include a line-scan camera enclosure 331. The line-scan camera enclosure 331 can include a steel casing that can encapsulate the line-scan camera 301. The line-scan camera 301 can extend perpendicularly downwards to the train track 103 from the shields 302. For example, the line-scan camera enclosure 331 can store the line-scan camera 301. Continuing this example, the line-scan camera enclosure 331 can attach to the two shields 302 of the undercarriage line-scan inspection system 102.

Figure 3F:
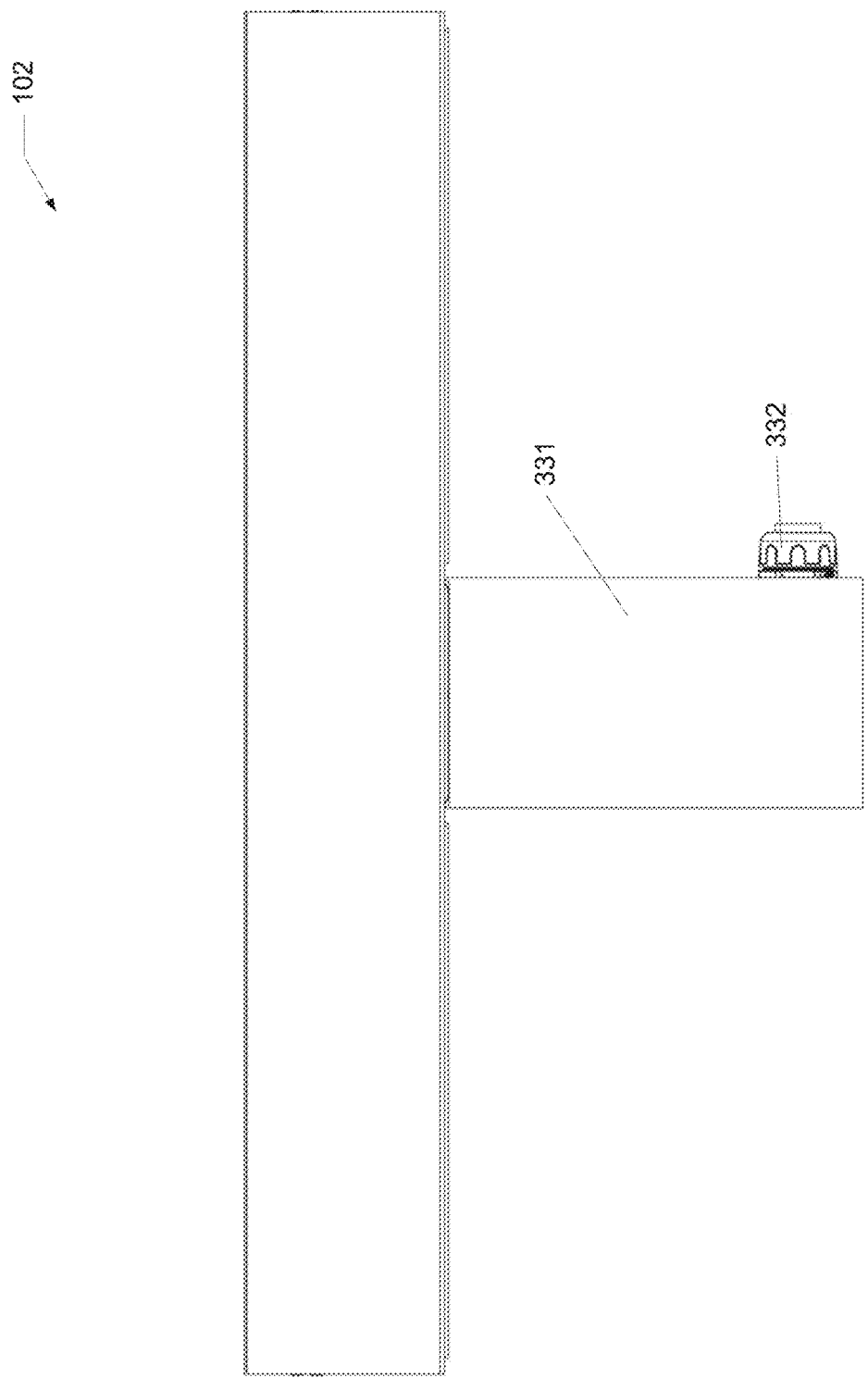
FIG. 3F illustrates an example second side view of an undercarriage line-scan inspection system, in accordance with the disclosed technology.

Referring now to FIG. 3F, illustrated is an example second side view of the undercarriage line-scan inspection system 102, in accordance with the disclosed technology. The undercarriage line-scan inspection system 102 can include one or more conduit adapters 332. The conduit adapters 332 can function as water-tight entries into the line-scan camera enclosure 331. For example, one or more wires and/or compressed air lines can travel through the conduit adapters 332 into the line-scan camera enclosure 331.

Figure 3G:
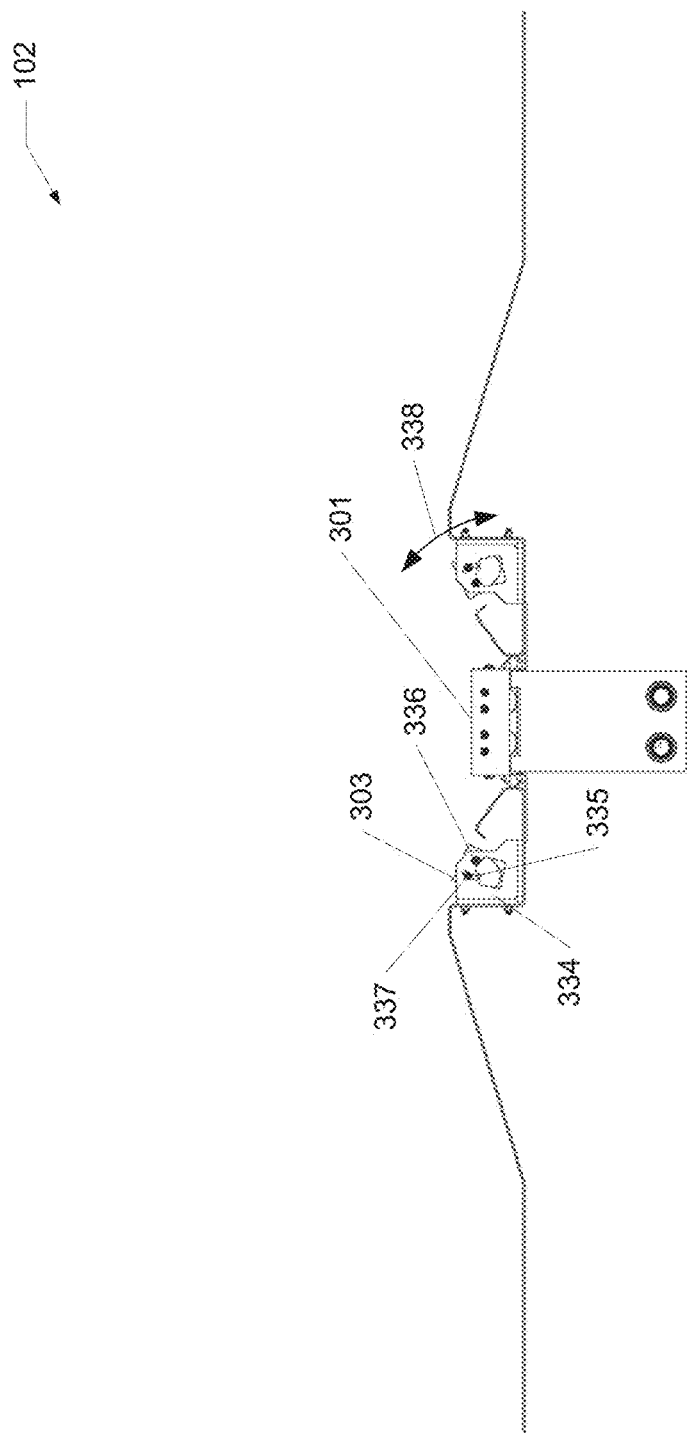
FIG. 3G illustrates an example third side view of an undercarriage line-scan inspection system, in accordance with the disclosed technology.

Referring now to FIG. 3G, illustrated is an example third side view of the undercarriage line-scan inspection system 102, in accordance with the disclosed technology. The undercarriage line-scan inspection system 102 can include the angled lighting strips 303. The angled lighting strips 303 can be angled towards the line-scan camera 301 such as to illuminate a particular region above the line-scan camera 301. The angled lighting strips 303 can attach to an angled lighting frame 334. The angled lighting frame 334 can include a pivot point 336 and an angle adjustment point 337. The angled lighting frame 334 can exist at both ends of the angled lighting strips 303. The angled lighting strips 303 can fix to the pivot point 336 through a screw, lag bolt, and/or any other applicable fixing mechanism such that the angled lighting strips 303 can rotate about the pivot point 336. For example, the angled lighting strips 303 can rotate in a first direction 338. The angled lighting strips 303 can be secured in a particular angled configuration based on the location of the adjustment point within an adjustment aperture 335. For example, the angled lighting strips 303 can include a screw that is located at the adjustment point 337 and moves freely within the adjustment aperture 335. On determining the angled configuration of the angled lighting strip 303, the screw at the adjustment point 337 can be tightened and secured within the adjustment aperture 335, thus securing the angled lighting strips 303 to the angled lighting frame 334.

Figure 3H:
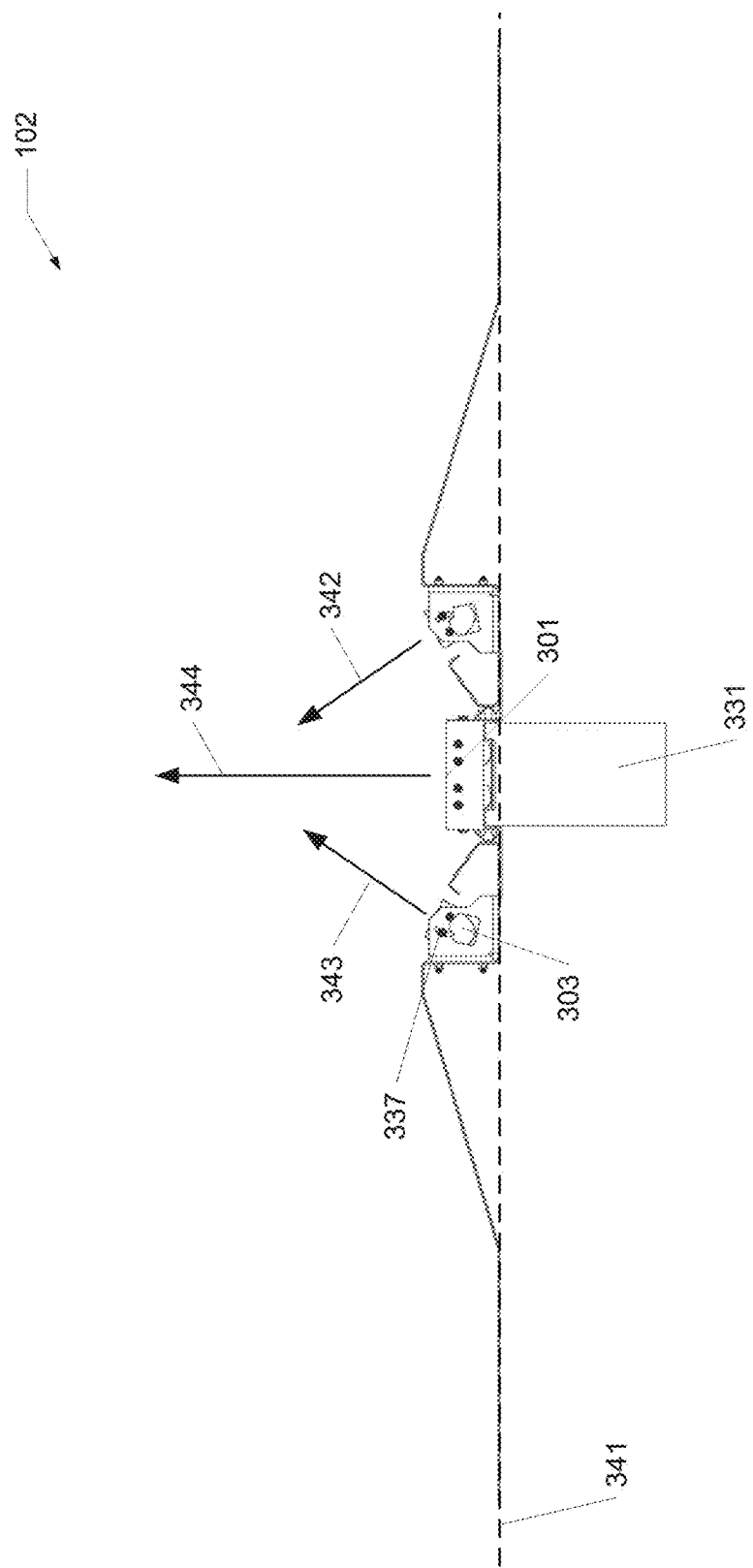
FIG. 3H illustrates an example fourth side view of an undercarriage line-scan inspection system, in accordance with the disclosed technology.

Referring now to FIG. 3H, illustrated is an example fourth side view of the undercarriage line-scan inspection system 102, in accordance with the disclosed technology. The line-scan camera enclosure 331 can extend below a horizontal plane 341. The horizontal plane 341 can represent the surface of the rail ties 104 where the undercarriage line-scan inspection system 102 is attached. The line-scan camera enclosure 331 can extend below the horizontal plane 341 between two rail ties 104 (not illustrated).

The angled lighting strips 303 can illuminate in a first direction 342 and a second direction 343. The angled lighting strips 303 can illuminate the third direction 344. The third direction 344 can define the direction in which the line-scan camera captures line-scan images of the undercarriage of the passing railcar. The angle between the first direction 342 and the horizontal plane 341 and the second direction 343 and the horizontal plane 341 can be varied through the adjustment point 337. For example the angle between the first direction 342 and the horizontal plane 341 and the second direction 343 and the horizontal plane 341 can measure at least 0 degrees, 0 to 90 degrees, 45 degrees, 45 to 90 degrees, or less than 90 degrees.

Figure 3I:
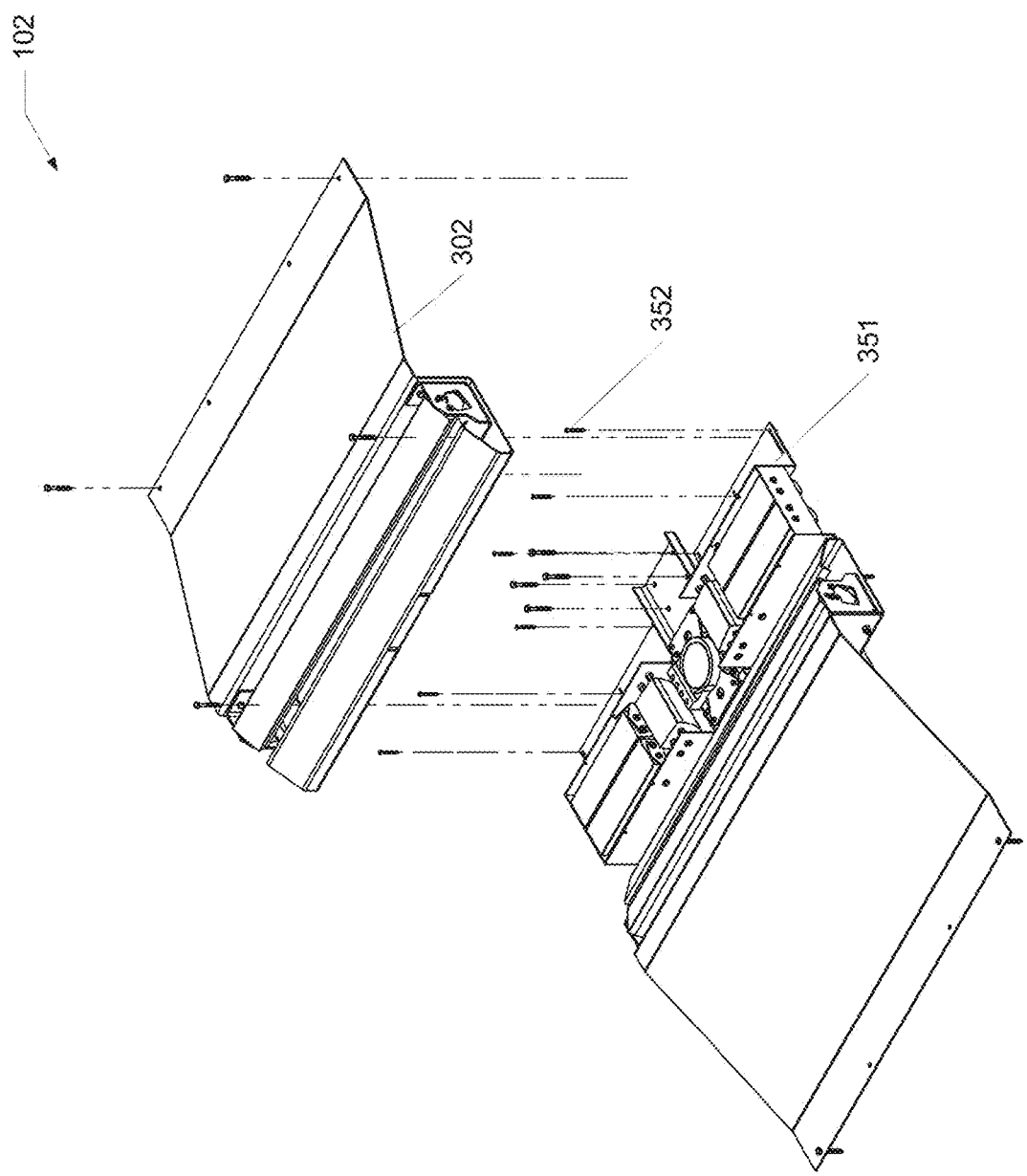
FIG. 3I illustrates an exploded view of the undercarriage line-scan inspection system, in accordance with the disclosed technology.

Referring now to FIG. 3I, illustrated is a partially exploded view of the undercarriage line-scan inspection system 102, in accordance with the disclosed technology. The one or more shields 302 can attach to a line-scan system frame 351 through one or more screws 352. The one or more shields 302 can be removed in case there is excessive damage during use. For example, if one shield 302 is damaged while the other shield 302 is functional, the damaged shield 302 can be removed and replaced while keeping the other shield 302 intact.

Figure 3J:
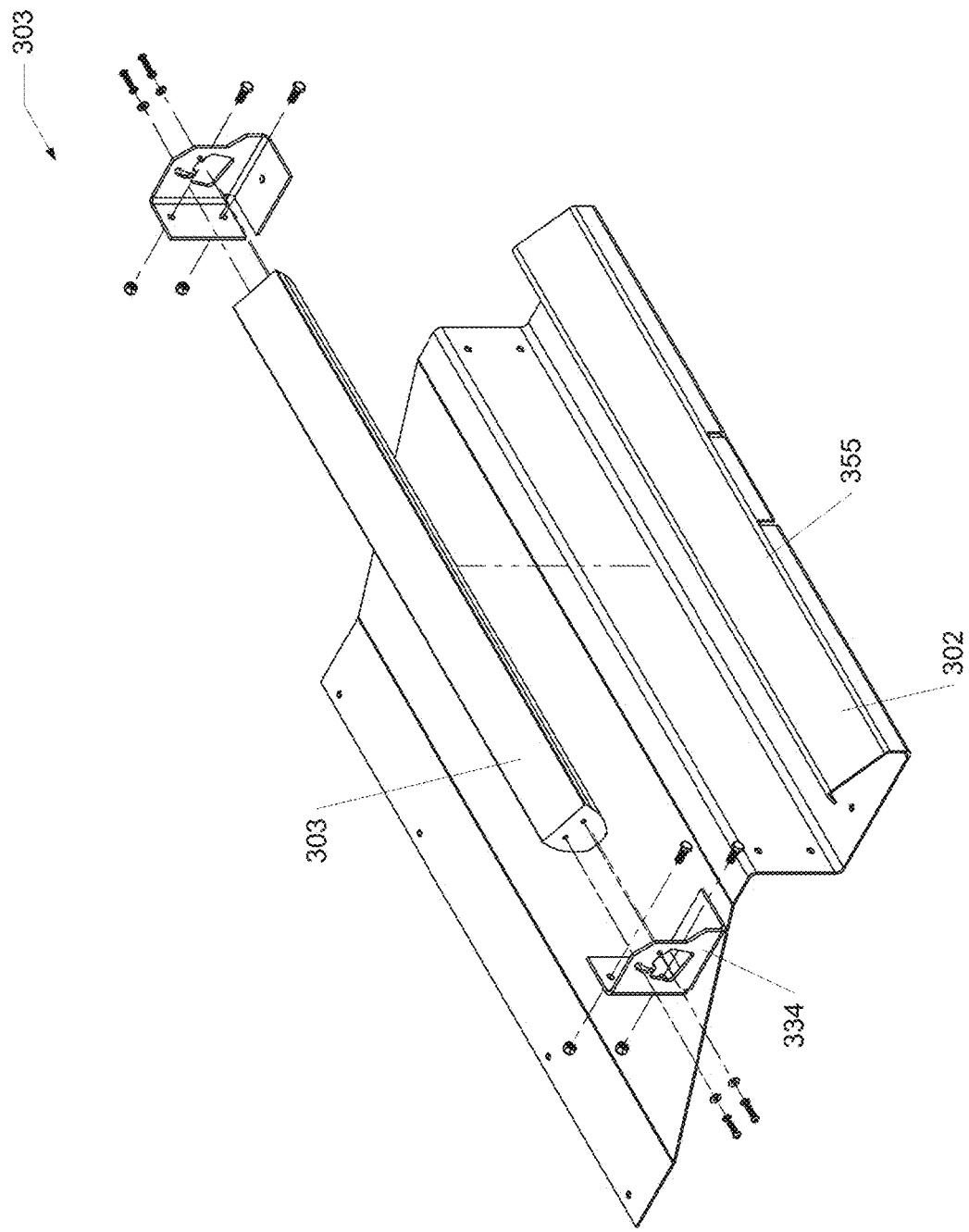
FIG. 3J illustrates an exploded view of an angled lighting strip, in accordance with the disclosed technology.

Referring now to FIG. 3J, illustrated is a partially exploded view of the angled lighting strip 303, in accordance with the disclosed technology. The angled lighting strip 303 can attach to the two angled lighting frames 334. The angled lighting frames 334 can secure the angled lighting strip 303 to the shield 302. For example, the angled lighting frames 334 can fix to the shield using one or more screws, bolts, lag bolts, and/or any other applicable fixing mechanism. The shield 302 can include a front lip 355 to protect the angled lighting strips 303 from debris.

Figure 3K:
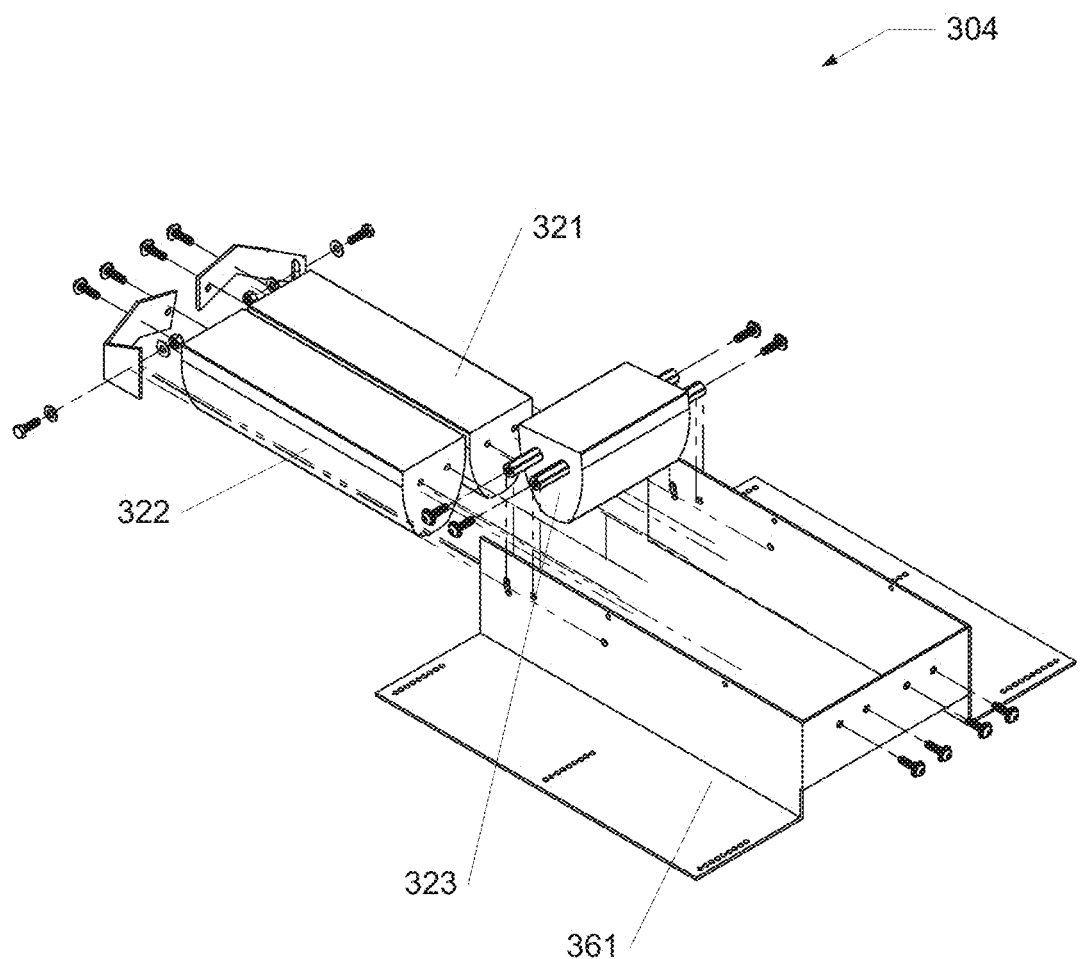
FIG. 3K illustrates an exploded view of a vertical lighting assembly, in accordance with the disclosed technology.

Referring now to FIG. 3K, illustrated is an exploded view of the vertical lighting assembly 304, in accordance with the disclosed technology. The first light 321, the second light 322, and the third light 323 can each attach to a vertical lighting frame 361. The first light 321, the second light 322 and the third light 323 can each attach to the vertical lighting frame 361 through one or more screws, bolts, lag bolts, and/or any other particular fixing mechanism. The vertical lighting frame 361 can be fixed to the shields 302 and/or the line-scan system frame 351.

Figure 3L:
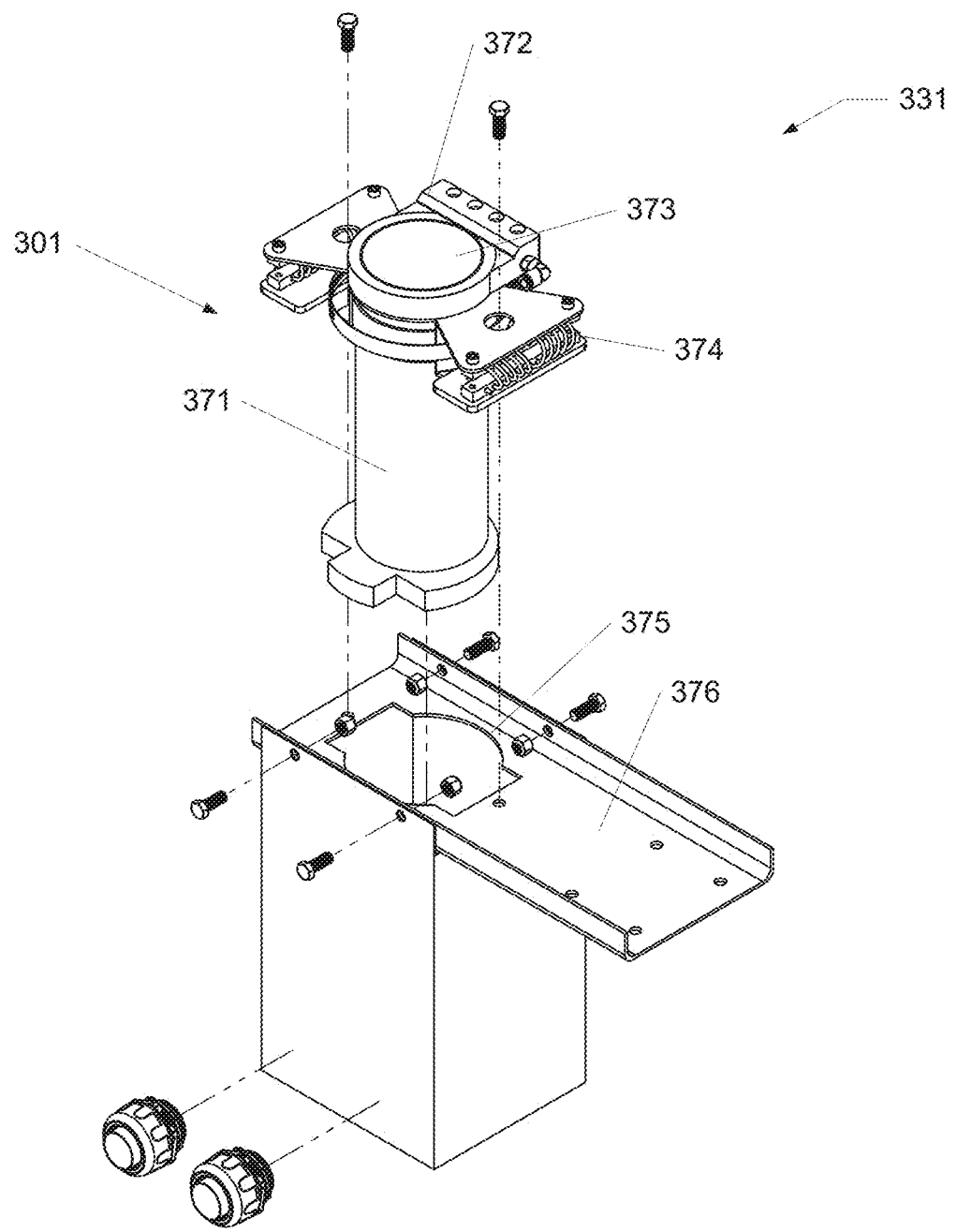
FIG. 3L illustrates an exploded view of a line-scan camera enclosure, in accordance with the disclosed technology.

Referring now to FIG. 3L, illustrated is an exploded view of the line-scan camera enclosure 331, in accordance with the disclosed technology. The line-scan camera 301 can include a housing 371, an air curtain apparatus 372, a lens 373, and one or more dampeners 374. The housing can include a hardened steel structure that can protect the internal components of the line-scan camera 301. The air curtain apparatus 372 can connect to a compressed air source to generate an air curtain. The air curtain can blow air over the lens 373 to clean debris of the lens 373. The dampeners 374 can be or include one or more spring-based dampeners or other dampening devices used to reduce the mechanical vibrations exhibited onto the line-scan camera 301 as the railcar passes over the undercarriage line-scan inspection system 102. The dampeners 374 can be configured to adjustably set the spring tension and/or dampening effect, e.g., to compensate for different ranges of expected vibrations. The line-scan camera 301 can partially extend through an enclosure aperture 375 and fix to a top surface 376 of the line-scan camera enclosure 331.

Figure 4:
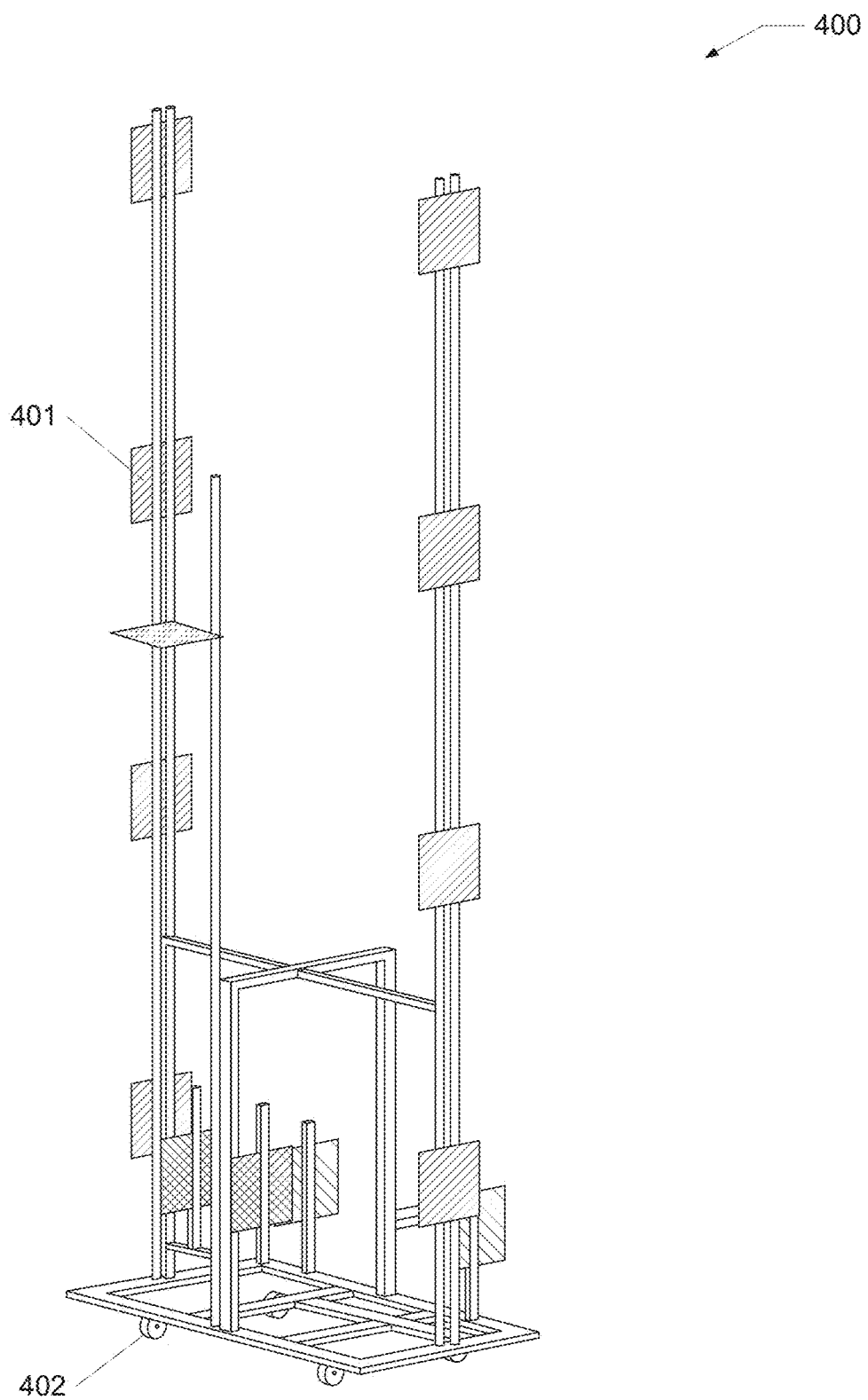
FIG. 4 illustrates a perspective view of portal focus cart, in accordance with the disclosed technology.

Referring now to FIG. 4, illustrated is a perspective view of a portal focus cart 400, in accordance with the disclosed technology. The various cameras of the undercarriage area-scan inspection system 101 and the undercarriage line-scan inspection system 102 can focus on the components or regions of interest of the passing railcar. For example, during installation of the undercarriage area-scan inspection system 101 and the undercarriage line-scan inspection system 102 (and/or periodically following the initial installation), the undercarriage area-scan inspection system 101 and the undercarriage line-scan inspection system 102 can use the portal focus cart 400 to calibrate one or more sensors and/or cameras of the undercarriage area-scan inspection system 101 and the undercarriage line-scan inspection system 102, respectively. Such an apparatus can have various targets 401 placed at various locations within the portal focus cart 400 such that focusing cameras on those regions can produce the desired results when the passing railcar travels past the undercarriage area-scan inspection system 101 and the undercarriage line-scan inspection system 102. Such targets 401 can have fiducial markers such that their location and orientation may be automatically detected by image processing algorithms of the computing system applied to the image feeds from the cameras of the undercarriage area-scan inspection system 101 and the undercarriage line-scan inspection system 102. The portal focus cart 400 may also have wheels 402 and one or more motor(s) such that it can be placed on the train tracks 103 and moved past the undercarriage area-scan inspection system 101 and the undercarriage line-scan inspection system 102. The portal focus cart can pass the undercarriage area-scan inspection system 101 and the undercarriage line-scan inspection system 102 at some speed so as to mimic a passing railcar. Various components of the portal focus cart 400 can collapse or telescope such that the portal focus cart 400 can be stored and transported more conveniently. The portal focus cart 400 can also be configured so as to set the depth of field as desired, for example through the use of multiple focusing targets 401.

The foregoing description of the present systems and processes has been presented only for the purposes of illustration and description and is not intended to be exhaustive or to limit the innovations to the precise forms disclosed. Many modifications and variations are possible in light of the above teaching.

The examples of the present systems and processes were chosen and described in order to explain the principles of the claimed innovations and their practical application so as to enable others skilled in the art to utilize the innovations and various examples with various modifications as are suited to the particular use contemplated. Alternative examples of the disclosed technology will become apparent to those skilled in the art to which the claimed innovations pertain without departing from their spirit and scope. Accordingly, the scope of the claimed innovations is defined by the appended claims rather than the foregoing description and the examples described therein.

What is claimed is:

1. An inspection assembly comprising:
   a first angled camera oriented at least partially in a vertical direction and at least partially in a first horizontal direction, the first angled camera being directed to a first target region in a three-dimensional space from a first viewpoint;
   a second angled camera oriented at least partially in the vertical direction and at least partially in a second horizontal direction that is substantially opposite the first horizontal direction, the second angled camera being directed to a second target region in a three-dimensional space from a second viewpoint;
   an upright camera oriented substantially in a vertical direction, the upright camera being configured to capture images of a third target region in the three-dimensional space from a third viewpoint;
   one or more lights;
   a housing configured to attach to a railway at a location between opposing rails of the railway; and
   one or more air curtains configured to blow air across a lens of at least one of the first angled camera, the second angled camera, or the upright camera.

2. The inspection assembly of claim 1, wherein the first angled camera is positioned a first distance from the upright camera and the second angled camera is positioned a second distance from the upright camera, at least one of the first distance or the second distance being at least 30 inches.

3. The inspection assembly of claim 1, wherein the housing comprises:
   a first shroud covering at least a rear portion of the first angled camera, the first shroud having an upper height proximate a lens of the first angled camera and sloping downwardly in a first direction extending away from a center of the inspection assembly; and
   a second shroud covering at least a rear portion of the second angled camera, the second shroud having an upper height proximate a lens of the second angled camera and sloping downwardly in a second direction extending away from the center of the inspection assembly.

4. The inspection assembly of claim 1, wherein the inspection assembly has a length that can extend across at least six rail ties of the railway.

5. The inspection assembly of claim 1, wherein the one or more lights comprises a plurality of light arrays, the light arrays being substantially co-planarly arranged around the upright camera to form a light platform configured to distribute light in the vertical direction.

6. The inspection assembly of claim 1, wherein at least two of the first target region, the second target region, or the third target region are the same target region.

7. The inspection assembly of claim 6, wherein the first angled camera, the second angled camera, and the upright camera are configured to capture images of the same target region substantially simultaneously.

8. The inspection assembly of claim 6, wherein the first angled camera, the second angled camera, and the upright camera are configured to capture images of the same target region within one microsecond of one another.

9. The inspection assembly of claim 1, wherein the inspection assembly is configured to attach to the railway such that an uppermost portion of the inspection assembly is lower than a lowermost top surface of the opposing rails when the inspection assembly is attached to the railway.

10. The inspection assembly of claim 1, wherein at least one of the first angled camera, the second angled camera, or the upright camera is an area scan camera.

11. An inspection assembly comprising:
    one or more line scan cameras configured to capture images in a generally vertical direction;
    a first light source configured to emit light in a first direction that extends at least partially in the generally vertical direction and at least partially in a first horizontal direction extending from the first light source toward the one or more line scan cameras;
    a second light source configured to emit light in a second direction that extends at least partially in the generally vertical direction and at least partially in a second horizontal direction extending from the second light source toward the one or more line scan cameras, the second horizontal direction being substantially opposite the first horizontal direction;
    a housing comprising:
      a base configured to at least partially support the one or more line scan cameras, the first light source, and the second light source;
      a first shroud located proximate the first light source and sloped downwardly in the second horizontal direction; and
      a second shroud located proximate the second light source and sloped downwardly in the first horizontal direction,
      wherein the second shroud is spaced apart from the first shroud to thereby form a gap within which the first light source, the second light source, and the one or more line scan cameras are positioned, wherein the housing is configured to attach to a railway at a location between opposing rails of the railway; and one or more air curtains configured to blow air across a lens of a corresponding one of the one or more line scan cameras.

12. The inspection assembly of claim 11, wherein the first horizontal direction and the second horizontal direction are approximately parallel to opposing rails of the railway.

13. The inspection assembly of claim 11, wherein the first horizontal direction and the second horizontal direction are approximately perpendicular to opposing rails of the railway.

14. The inspection assembly of claim 1, wherein the inspection assembly has a length that can extend across at least four rail ties of the railway.

15. The inspection assembly of claim 11, wherein the inspection assembly is configured to attach to the railway such that an uppermost portion of the inspection assembly is lower than a lowermost top surface of the opposing rails when the inspection assembly is attached to the railway.

16. The inspection assembly of claim 11, further comprising one or more dampening devices, each of the one or more dampening devices being disposed between the housing and a corresponding one of the one or more line scan cameras.

17. An inspection system comprising:
a first inspection assembly comprising:
a first angled camera oriented at least partially in a vertical direction and at least partially in a first horizontal direction, the first angled camera being directed to a first target region in a three-dimensional space from a first viewpoint;
a second angled camera oriented at least partially in the vertical direction and at least partially in a second horizontal direction that is substantially opposite the first horizontal direction, the second angled camera being directed to a second target region in a three-dimensional space from a second viewpoint;
an upright camera oriented substantially in a vertical direction, the upright camera being configured to capture images of a third target region in the three-dimensional space from a third viewpoint;
one or more lights; and
a first housing configured to attach to a railway at a first location along a railway, the first location being between opposing rails of the railway;
a second inspection assembly comprising:
one or more line scan cameras configured to capture images in the vertical direction;
a first light source configured to emit light in a first direction that extends at least partially in the vertical direction and at least partially in the first horizontal direction;
a second light source configured to emit light in a second direction that extends at least partially in the vertical direction and at least partially in the second horizontal direction;
a second housing comprising:
a second base configured to at least partially support the one or more line scan cameras, the first light source, and the second light source;
a first shroud located proximate the first light source and sloped downwardly in the second horizontal direction; and
a second shroud located proximate the second light source and sloped downwardly in the first horizontal direction,
wherein the second shroud is spaced apart from the first shroud to thereby form a gap within which the first light source, the second light source, and the one or more line scan cameras are positioned,
wherein the second housing is configured to attach to the railway at a second location along the railway, the second location being between the opposing rails of the railway and different from the first location; and
one or more computing devices in electrical communication with the first inspection assembly and the second inspection assembly, the one or more computing devices being configured to:
control operations of the first angled camera, the second angled camera, the upright camera, the one or more lights, the one or more line scan cameras, the first light source, and the second light source; and
determine capture timings for each of the first angled camera, the second angled camera, the upright camera, and the one or more line scan cameras based at least in part on an estimated speed of a passing railcar such that the first angled camera, the second angled camera, and the upright camera are configured to simultaneously capture images of the passing railcar as the passing railcar passes over the first inspection assembly and the one or more line scan cameras are configured to capture images of the passing railcar as the passing railcar passes over the second inspection assembly.

* * * * *